United States Patent [19]

Bennett et al.

[11] 4,263,650
[45] Apr. 21, 1981

[54] DIGITAL DATA PROCESSING SYSTEM WITH INTERFACE ADAPTOR HAVING PROGRAMMABLE, MONITORABLE CONTROL REGISTER THEREIN

[75] Inventors: Thomas H. Bennett; Earl F. Carlow, both of Scottsdale; Edward C. Hepworth, Apache Junction, all of Ariz.; Wilbur L. Mathys, Norristown, Pa.; William D. Mensch, Jr., Norristown, Pa.; Rodney H. Orgill, Norristown, Pa.; Charles I. Peddle, Norristown, Pa.; Michael F. Wiles, Phoenix, Ariz.

[73] Assignee: Motorola, Inc., Schaumburg, Ill.

[21] Appl. No.: 7,752

[22] Filed: Jan. 30, 1979

Related U.S. Application Data

[63] Continuation of Ser. No. 519,149, Oct. 30, 1974, abandoned.

[51] Int. Cl.³ .......................... G06F 3/04; G06F 9/00; G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,462,742 | 8/1969 | Miiller et al. | 364/200 |
| 3,579,201 | 5/1971 | Langley | 364/200 |
| 3,648,252 | 3/1972 | Thron et al. | 364/200 |
| 3,668,650 | 6/1972 | Wang | 364/200 |
| 3,702,462 | 11/1972 | England | 364/200 |
| 3,702,988 | 11/1972 | Haney et al. | 364/200 |
| 3,745,532 | 7/1973 | Erwin | 364/200 |
| 3,748,649 | 7/1973 | McEowen et al. | 364/200 |
| 3,757,306 | 9/1973 | Boone | 364/200 |
| 3,757,308 | 9/1973 | Fosdick | 364/200 |
| 3,758,761 | 9/1973 | Henrion | 364/200 |
| 3,771,135 | 11/1973 | Huettner et al. | 364/200 |
| 3,798,606 | 3/1974 | Henle et al. | 364/200 |
| 3,800,129 | 3/1974 | Umstattd | 364/200 X |
| 3,821,715 | 6/1974 | Hoff, Jr. et al. | 364/200 |
| 3,828,325 | 8/1974 | Stafford et al. | 364/200 |
| 3,833,930 | 9/1974 | Macker | 364/200 |
| 3,902,162 | 8/1975 | Parkinson et al. | 364/200 |
| 3,905,025 | 9/1975 | Davis et al. | 364/200 |
| 3,909,790 | 9/1975 | Shapiro et al. | 364/200 |
| 3,938,098 | 2/1976 | Garlic | 364/200 |
| 3,984,813 | 10/1976 | Chung | 364/200 |
| 3,996,564 | 12/1976 | Kerrigan et al. | 364/200 |
| 4,027,290 | 5/1977 | Subrizi et al. | 364/200 |
| 4,087,852 | 5/1978 | Campbell et al. | 364/200 |

OTHER PUBLICATIONS

"Intel MCS-4 Micro Computer Set", Intel Corp., Jan. 1972.
Wickes, W. E.; "A Compatible MOS/LSI Microprocessor Device Family", in *Computer Design*, Jul. 1973; pp. 75–81.
Altman, L.; "Single-Chip Microprocessors Open Up a New World of Applications", in *Electronics*, Apr. 18, 1974; pp. 81–100.

*Primary Examiner*—Melvin B. Chapnick
*Attorney, Agent, or Firm*—Vincent B. Ingrassia

[57] ABSTRACT

A digital system including a plurality of metal-oxide-semiconductor (MOS) chip random access memories (RAM), read only memories (ROM) and peripheral interface adaptors coupled to a common bidirectional data bus which is coupled to and controlled by a microprocessor unit (MPU). Each peripheral interface adaptor includes a control register loadable under program control. The contents of the control register control selection of several registers within the interface adaptor. The control register also controls other functions of the peripheral interface adaptor, including determining direction of data movement at the peripheral buffers of the interface adaptor. The contents of the control register of each interface adaptor are monitorable by the microprocessor unit.

6 Claims, 20 Drawing Figures

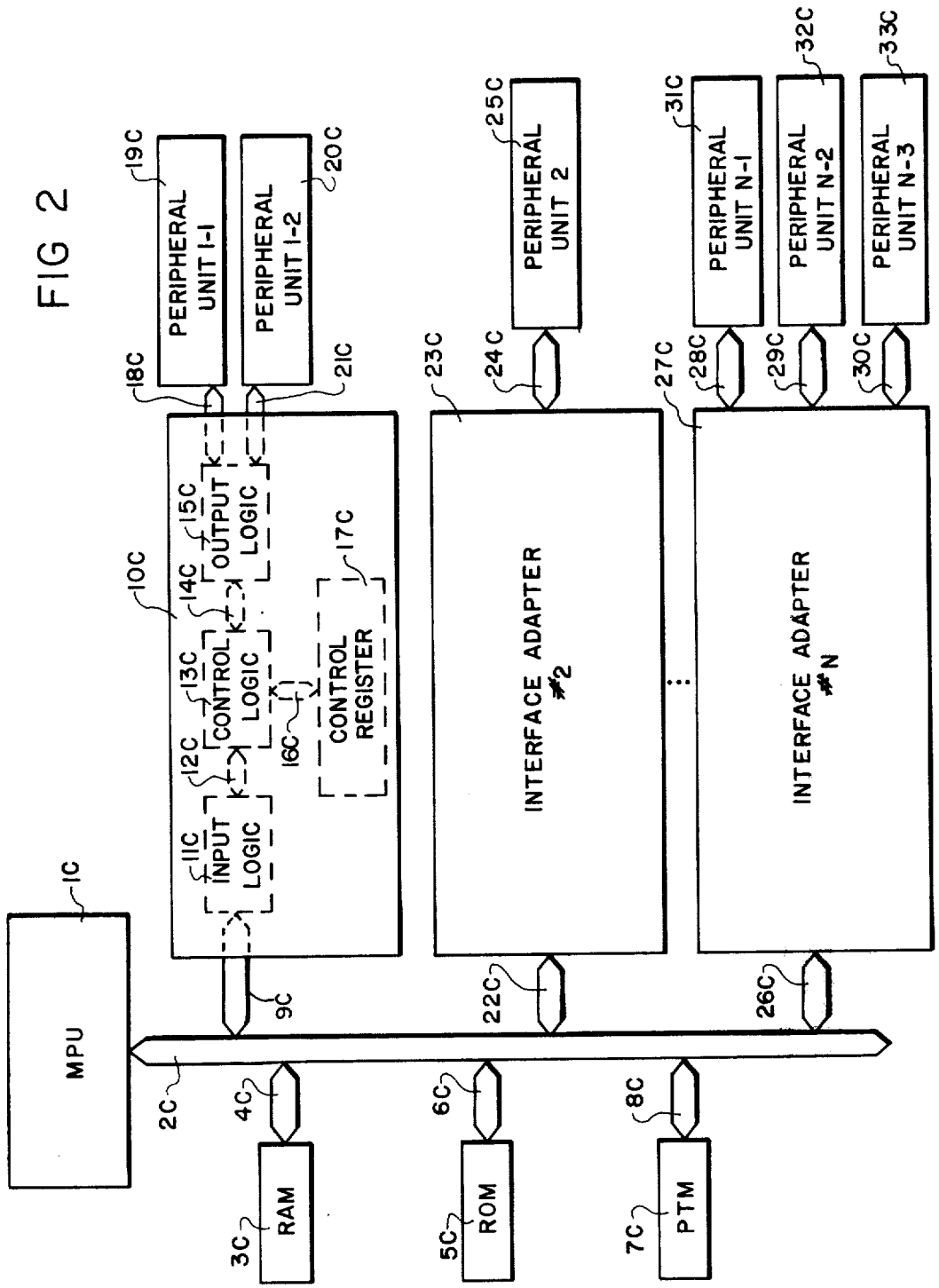

*ACTIVE LEVEL DEFINED AT TIME OF MANUFACTURE.

*INDICATES → (RS R/W)

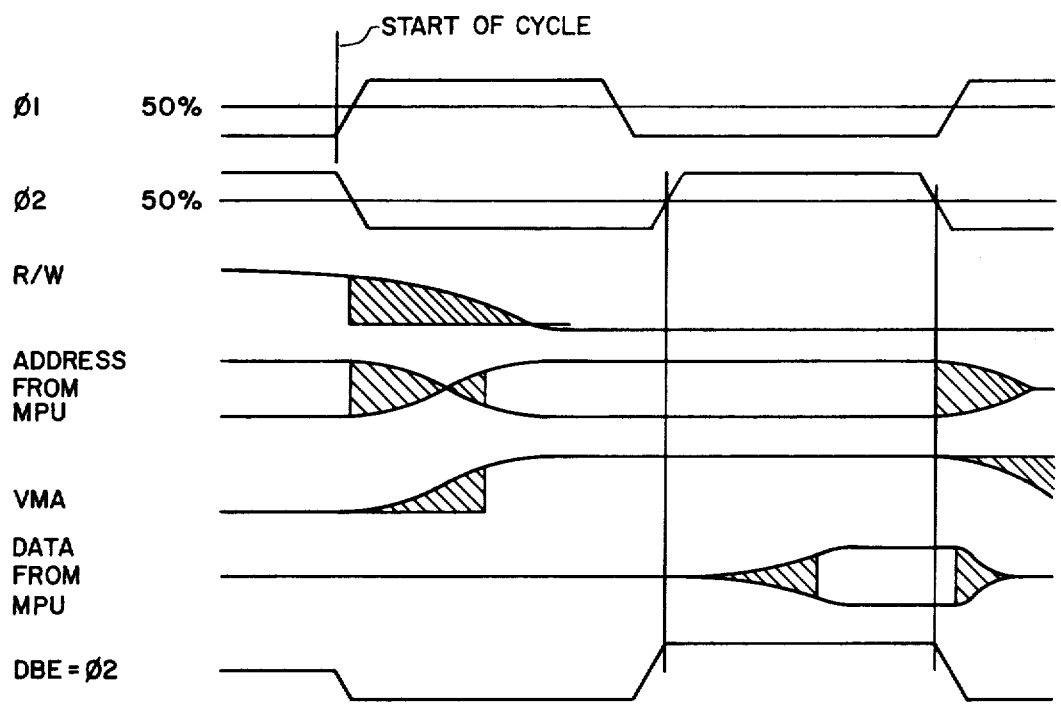
FIG. 13a
FIG. 13b
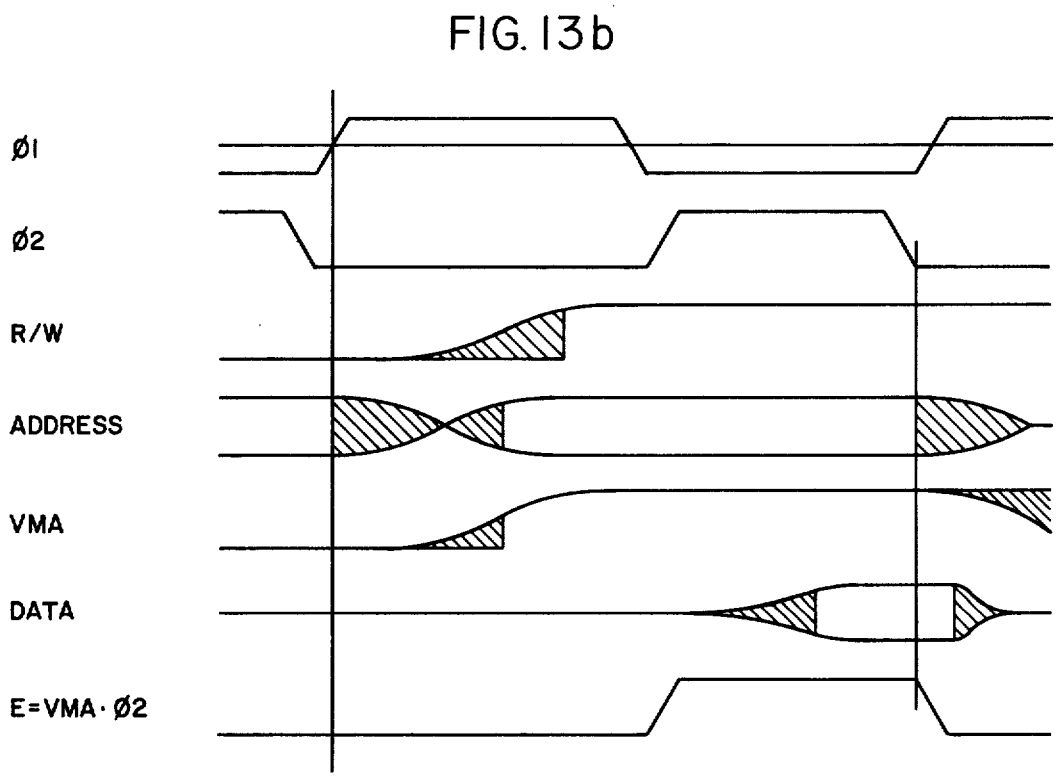

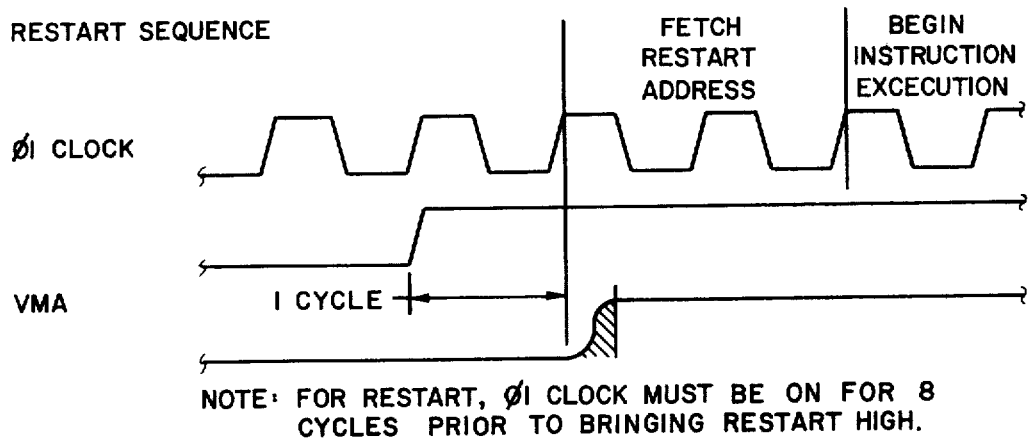
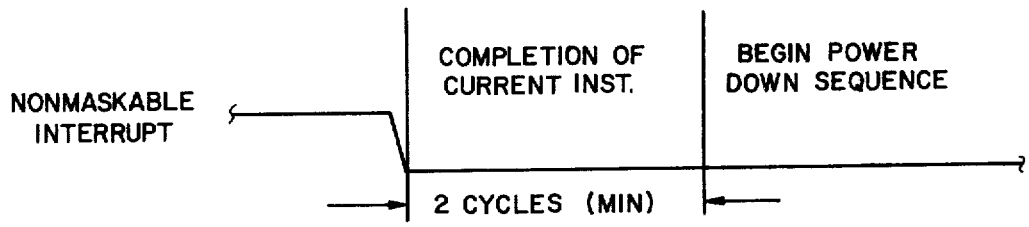
FIG. 13c
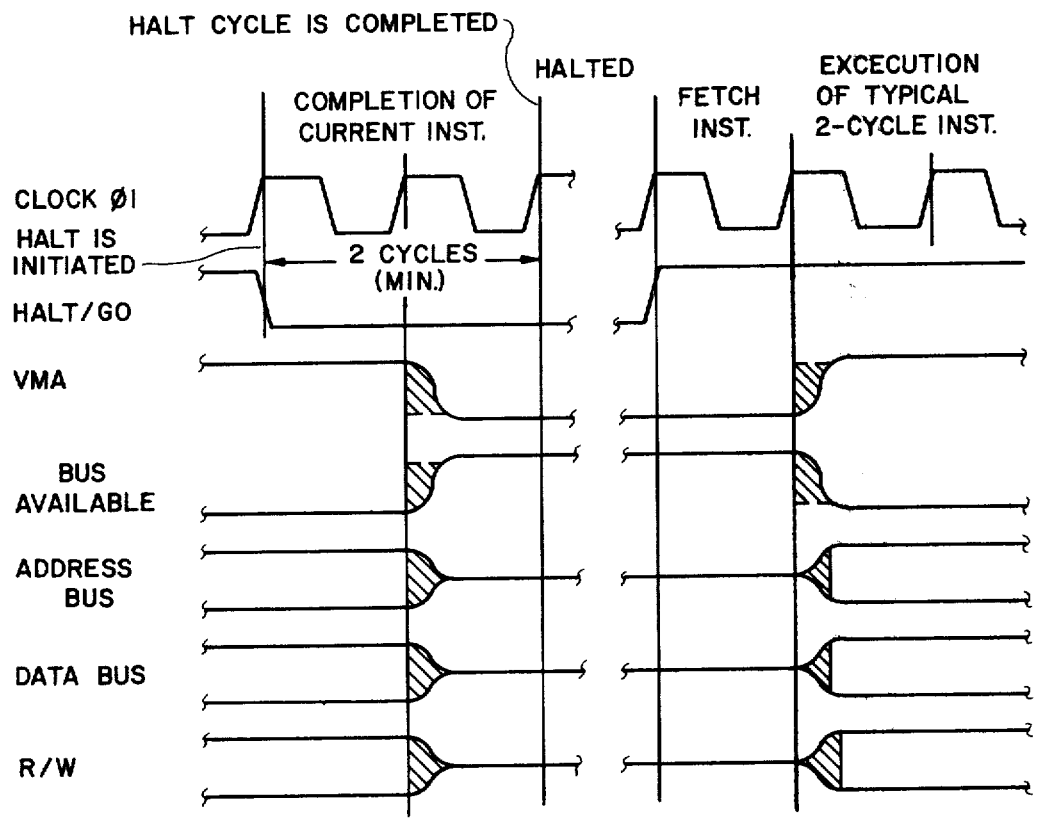
FIG. 13d

DIGITAL DATA PROCESSING SYSTEM WITH INTERFACE ADAPTOR HAVING PROGRAMMABLE, MONITORABLE CONTROL REGISTER THEREIN

This is a continuation, of application Ser. No. 519,149, filed Oct. 30, 1974, now abandoned.

RELATED APPLICATIONS

This invention is related to the following patent applications filed simultaneously with the parent application and assigned to the assignee of this application: Ser. No. 519,150, now abandoned, by Bennett et al, entitled MICROPROCESSOR ARCHITECTURE; Ser. No. 519,138, now abandoned, by Bennett et al, entitled INTERFACE ADAPTOR ARCHITECTURE; Ser. No. 519,131, now U.S. Pat. No. 3,979,730, by Bennett et al, entitled INTERFACE ADAPTOR HAVING CONTROL REGISTER; Ser. No. 519,132, now abandoned, by Bennett et al, entitled MICROPROCESSOR CHIP BUS CONTROL SYSTEM; Ser. No. 519,133, now U.S. Pat. No. 4,004,281, by Bennett et al, entitled MICROPROCESSOR CHIP REGISTER BUS STRUCTURE; Ser. No. 519,134, now abandoned, by Bennett et al, entitled MICROPROCESSOR CHIP CIRCUITRY; Ser. No. 519,135, now abandoned, by Bennett et al, entitled MICROPROCESSOR SYSTEM DATA BUS; Ser. No. 519,136, now U.S. Pat. No. 3,962,682, by Bennett et al, entitled SPLIT LOW ORDER INTERNAL ADDRESS BUS FOR MICROPROCESSOR; Ser. No. 519,137, now U.S. Pat. No. 4,003,028, by Bennett et al, entitled INTERRUPT CIRCUITRY FOR MICROPROCESSOR CHIP; Ser. No. 519,139, now U.S. Pat. No. 4,004,283, by Bennett et al, entitled MULTIPLE INTERRUPT MICROPROCESSOR SYSTEM; Ser. No. 519,140, now U.S. Pat. No. 4,011,448, by Bennett et al, entitled INTERRUPT CIRCUITRY FOR MICROPROCESSOR CHIP; Ser. No. 519,141, now abandoned, by Mathys et al, entitled CONTROL REGISTER FOR INTERFACE ADAPTOR ADDRESS EXPANSION; Ser. No. 519,142, now abandoned, by Carlow et al, entitled DATA DIRECTION REGISTER FOR INTERFACE ADAPTOR CHIP; Ser. No. 519,143, now abandoned, by Carlow et al, entitled INTERRUPT STATUS REGISTER FOR INTERFACE ADAPTOR CHIP; Ser. No. 519,144, now abandoned, by Wiles, entitled NON-MASKABLE INTERRUPT MICROPROCESSOR SYSTEM; Ser. No. 519,145, now abandoned, by Hepworth et al, entitled MASTER-SLAVE CONTROL REGISTER FOR INTERFACE ADAPTOR CHIP; and Ser. No. 519,146, now abandoned, by Bennett et al, entitled MICROPROCESSOR SYSTEM INCLUDING PLURALITY OF CONTROLLER CHIPS.

BACKGROUND OF THE INVENTION

Since their inception, digital applications have evolved from calculations to data processing in the area of control. In recent years, with the development of the so-called "minicomputers", applications, particularly in the control area, have greatly increased. Minicomputers today are at the heart of many systems since they are more flexible, can be easily personalized to a particular application, can be more readily changed or updated in such logic design systems, and most significantly, the cost of such computers is less than the cost of the large purpose digital computer. Unfortunately, the size and cost of even the smallest minicomputers have limited their use to relatively large and costly systems. Because of this, many smaller systems are fabricated with complex hardwire logic circuits. Recently developed microprocessor chips implemented using MOS technology and associated families using peripheral circuits now promise to bring a computing power of minicomputers, at much lower cost, to the many new areas and applications, including control functions such as numeric control, elevator control, highway and rail traffic control and process control. Such computers fabricated using MOS microprocessor chips may be referred to as microcomputers, and can be used as computer peripheral equipment control displays, keyboards, printers, readers, plotters, terminals, etc. Other applications for such microcomputer systems include computer systems and countless other applications within the fields of transportation, automotive uses, medical electronics, test systems, and many others.

The recent development of a "Microprocessor Unit" (MPU) which is fabricated in the form of a MOS monolithic integrated circuit, has made feasible a broad new range of digital control applications and has, concurrently, introduced a number of additional constraints which must be met for optimum system design of the stored program digital control sytems which are based on the MPU. First, the cost and complexity of the hardware and programs required to work with associated peripheral units must be minimized. In conventional systems based on stored program digital computers, the cost and complexity of the hardware required for the system to interface with a given peripheral unit were usually a minor consideration when compared with the cost of the main system. Systems based on use of integrated circuit microprocessors, however, are much lower in cost because of the economies of integrated circuit fabrication. In systems where an MPU is used to control a large number of peripherals, cost of the hardware, complexity of the interconnecting wiring and the quantity of memory required for program storage are often the dominant constraints. Second, systems utilizing an MPU must be designed to operate successfully without operator intervention. In conventional systems based on stored program digital computers, the availability of operator actions at key points in the overall operation of the system is generally assumed. When system operation is interrupted due to malfunction, such as failure of the system power, the general purpose digital computer system requires that an operator manually control the system via a control panel to perform the required functions of rewinding tapes, resetting discs, and reloading basic "bootstrap" programs via a computer control panel. In the case of MPU based systems, however, the typical application assumes operation in a remote location without an operator present and an optimum system design must make provisions for the system to reinitialize itself without the assistance of an operator and accomplish this reinitialization with a minimum of extra hardware and/or dedicated blocks of memory for special initializing programs. Third, MPU based systems must be organized to use a minimum number of wires in interconnecting to peripheral devices and must provide for expansion of the system in a modular fashion which satisfies the minimum wire constraint. In a system based on conventional stored program digital computers, the requirement for additional wires to provide the electrical signals required for address selection, control and interrupts for an additional peripheral device was not a major concern because it was relatively inexpensive to modify the printed circuit board structures used to fabricate the system in order to make available the required signals and to interconnect them via special wire. In MPU based systems, however, the total range of control signals available must be predetermined at the time of chip design and further, because of integrated circuit package costs and the lower production yields associated with the larger packages required to accommodate larger numbers of integrated circuit pins, it is important that the total number of wires dedicated to communication with peripheral devices be kept at a minimum.

SUMMARY OF THE INVENTION

An object of the invention is to provide a digital controller system which allows simple and economical sharing of controller tasks to meet a given system application requirement.

A further object of the invention is to provide a digital controller system which provides maximum flexibility in the application and control of peripheral units while minimizing the required peripheral interconnection through use of control register structures in interface circuits associated with the system.

A further object of the invention is to provide a digital controller system which uses a master system reset/reinitialize arrangement which minimizes the amount of time, complexity of program and quantity of program storage needed to resume normal system operation.

A further object of the invention is to provide a low cost integrated circuit microcomputer system.

Briefly described, the invention is a digital system including a first semiconductor chip for performing a digital data processing operation and a second semiconductor chip for performing selected or delegated digital data processing operations as determined by the first semiconductor chip, both the first semiconductor chip and the second semiconductor chip being connected to a common data bus. In a presently preferred embodiment the first semiconductor chip is a microprocessor chip and the second semiconductor chip is a peripheral interface adaptor further coupled to address outputs of the microprocessor chip. The peripheral interface adaptor chip has peripheral outputs coupled to peripheral equipment controlled by the digital system. In a presently preferred embodiment of the invention random access memory means and read only memory means are coupled to the common data bus and are also coupled to address bus means coupled to the microprocessor chip. MOS technology is utilized to implement the above mentioned chips in the presently preferred embodiment of the invention.

BRIEF DESCRIPTION OF THE DRAWINGS

FIG. 2 is a partial block diagrm of an MPU system illustrating control register organization according to the invention.

FIGS. 13A–13D are timing diagrams for write data, read data, restart and non-maskable interrupt, and halt/go sequences for a microprocessor system.

DETAILED DESCRIPTION OF THE INVENTION

| TABLE OF CONTENTS | |
|---|---|
| ENTRY | PAGE NO. |
| MICROPROCESSOR SYSTEM | 7 |
| MPU | 15 |
| PIA | 17 |
| RAM | 18 |
| ROM | 19 |
| ACIA | 20 |
| PROGRAMMING MODEL OF MPU | 21 |
| MINIMUM SYSTEM CONFIGURATION | 22 |
| SYSTEM INTERRUPTS | 24 |
| MPU OPERATION | 26 |
| PIA OPERATION | 34 |
| RAM OPERATION | 40 |
| ROM OPERATION | 42 |
| ACIA OPERATION | 43 |

MICROPROCESSOR SYSTEM

Figure 1A:
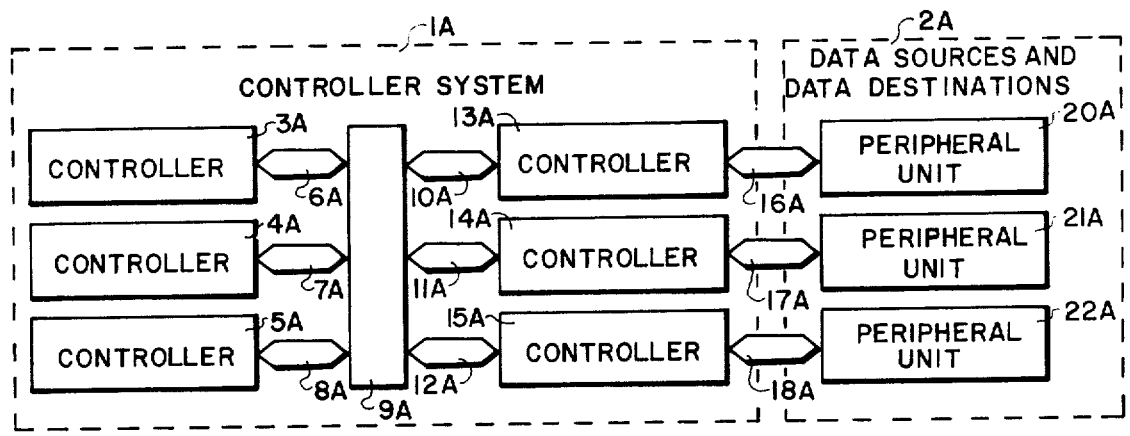
FIG. 1A is a block diagram of a generalized common bus controller system according to the invention.

The MPU system of this application is a particular case of a more general class of stored program data processing systems which may be referred to as data controller systems. FIG. 1A shows one possible embodiment of such a data controller system. The controller system 1A consists of a group of data controllers 3A, 4A, 5A, 13A, 14A and 15A, each of which is coupled to a common bus 9A via, respectively, bidirectional bus coupler 6A, 7A, 8A, 10A, 11A, and 12A. In a controller system of this type, the system design is optimized by specifying functions of each controller and interconnecting the controllers to each other via the common bus such that the total range of data processing that has to be performed by the overall controller system is efficiently subdivided into groups of tasks to be performed by each of the controller circuits that make up the system. In a typical controller system, some of the controller circuits will be adapted to be operationally coupled to a group of data sources and data destinations 2A. Thus, in addition to the previously recited bidirectional coupling to the common bus, controller 13A is coupled to a bidirectional bus 16A, which is coupled to a peripheral unit 20A. Controller 14A is coupled to a bidirectional bus 17A, which is coupled to a peripheral unit 21A, and controller 15A is coupled to a bidirectional bus 18A which is coupled to a peripheral unit 22A.

Figure 1B:
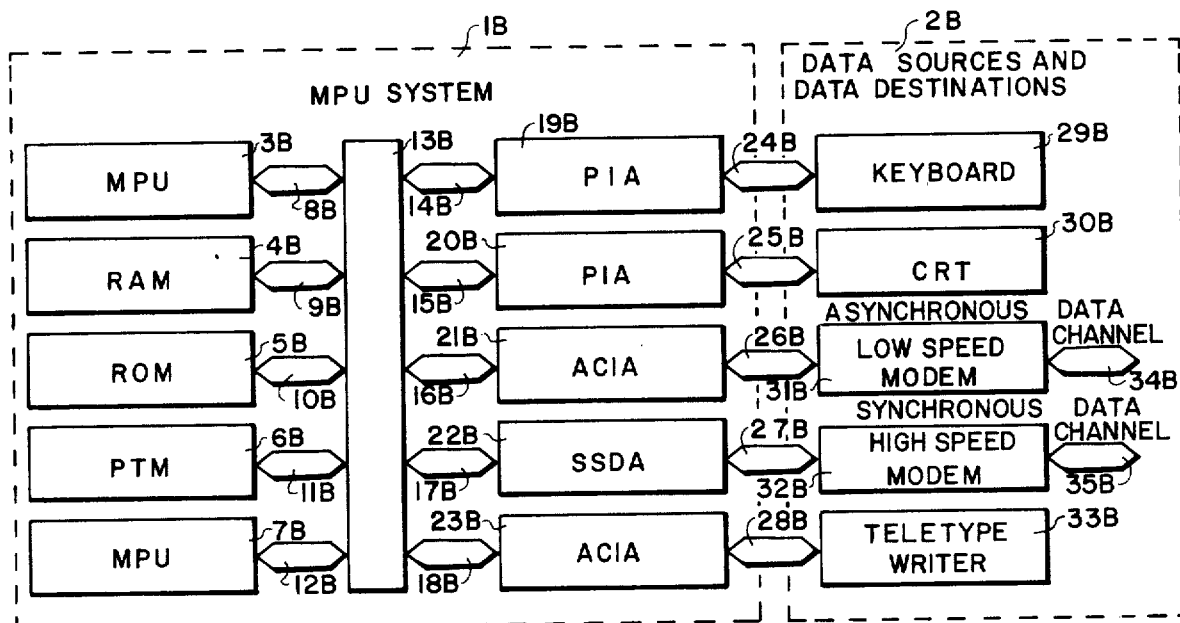
FIG. 1B is a block diagram of an MPU system according to the invention.

FIG. 1B shows a MPU system 1B which is a specific embodiment of a stored program digital system which falls within the general category of data controller systems. As in the previous discussion for FIG. 1A, the system is organized around a common bus, in this case, the common address and data bus 13B. The MPU chip 3B is coupled to a bidirectional coupler 8B which is coupled to the common bus 13B. The MPU chip performs a "master controller function" in this system since it executes stored program instructions and transmits and receives data and control signals required to perform over-all functions of the MPU system. The random access memory chip 4B is coupled to common bus 13B via bidirectional coupler 9B to provide temporary data storage for the system. Similarly, read only memory chip 5B is coupled to the common bus 13B via bidirectional coupler 10B to provide permanent data storage for the system. The program timer module chip 6B is coupled to the common bus 13B via bidirectional coupler 11B. This module responds to requests from the MPU chip 3B to generate timing signals of long duration and provides signals back to the MPU chip 3B when the extended time period is complete. This delegation of data processing requirements for generation of timing signals to an extended duration frees the microprocessing unit chip to perform other tasks while the timing generation takes place.

For certain complex or high speed data processing requirements, the data processing capability of the MPU system may be extended by coupling one or more additional microprocessor chips to the common bus. Thus MPU chip 7B is coupled to common bus 13B via bidirectional coupler 12B. This interconnection provides a further example of the manner in which controller chips of differing data processing capability may be coupled to a common bus to form a data processing system which meets overall data processing requirements.

In the typical MPU system, the major data processing task involves the correct sequencing of data and control signals between data source and data destinations 2B. Typically, communication with these data sources and data destinations requires the data to be processed and signal levels to be translated to put the data in forms which are compatible with the interconnection and signal levels suitable for transmission on common bus 13B. A special category of chips which can be called in general, interface adaptor chips, are used to perform this function. Thus the MPU system 1B has a peripheral interface adaptor (PIA) chip 19B which is coupled to the common bus 13B via bidirectional coupler 14B and also is coupled to bidirectional peripheral bus 24B. This bidirectional peripheral bus then is connected to a particular data source and data destination, in this case, a keyboard 29B. In a similar manner, PIA chip 20B is coupled to the common bus 13B via bidirectional coupler 15B and also is coupled to peripheral bus 25B which is coupled to the cathode ray tube (CRT) 30B. The PIA chip is specifically designed to adapt a wide variety of peripheral units to the common bus of the MPU system, as will be discussed in greater detail below.

A similar adaptive function may be performed by the asynchronous communications interface adaptor (ACIA) chip shown in FIG. 1B. The ACIA chip was specifically designed to handle the special data processing requirements of low speed asynchronous data channels. The specific embodiment of FIG. 1B shows two examples wherein ACIA chip 21B is coupled to the common bus 13B via bidirectional coupler 16B and also is coupled to a low speed modulator-demodulator chip 31B via bidirectional peripheral unit bus 26B. The low speed modem 31B is connected to an asynchronous data channel 34B. Similarly, ACIA data chip 23B is coupled to the common data bus 13B via bidirectional coupler 18B and to peripheral bus 28B. Peripheral bus 28B is coupled to a particular asynchronous data source and data destination, teletypewriter 33B.

FIG. 2 shows another specific embodiment of an MPU system with particular emphasis on the control of the control register in adapting a wide variety of peripheral units to the electrical requirements of the common system bus. The MPU chip 1C is coupled to the common system bus 2C which provides the means for bidirectional data transmission between all the other chips in the system. Thus, random access memory 3C is coupled to the common bus 2C via data coupler 4C. The Read Only memory 5C is coupled to common bus 2C via coupler 6C and the programmed timing module 7C is coupled to common bus 2C via data coupler 8C. Further, common bus 2C is coupled to a group of interface adaptor chips. Common bus 2C is coupled to a first interface adaptor chip 10C via bidirectional coupler 9C, a second interface adaptor chip 23C via bidirectional data coupler 22C, and interface adaptor chip 27C via bidirectional coupler 26C.

Internally first interface adaptor chip 10C is coupled via bidirectional data bus 2C to input logic circuit 11C, which in turn is coupled to a control logic circuit 13C via bus 12C. Control logic circuit 13C is coupled to bus 14C which is coupled to the output logic 15C and to bus 16C which is coupled to the control register 17C. The output logic 15C is adapted to connect to different combinations of peripheral units, in this case to peripheral unit 1-1, 19C via peripheral bus 18C and to peripheral unit 1-2, 20C via peripheral bus 21C. The function of the control register 17C is to modify the sequential and combinatorial logic functions of the control logic circuit 13C as dictated by control words transmitted from the MPU chip 1C during appropriate times in the data processing sequence. This function of control register 17C allows varying requirements of the peripheral units such as peripheral unit 19C and peripheral unit 20C to be adapted to requirements of common bus 2C of the system.

The same type of control register organization resides in the other interface adaptor chips of the system such as second interface adaptor chip 23C which is coupled to the common bus 2C via bidirectional data coupler 22C and to peripheral unit number 2, 25C via bidirectional peripheral bus 24C, and interface adaptor chip 27C which is coupled to the common bus 2C via bidirectional coupler 26C and to three peripheral units 31C, 32C, and 33C via bidirectional peripheral buses 28C, 29C, and 30C, respectively.

Figure 3:
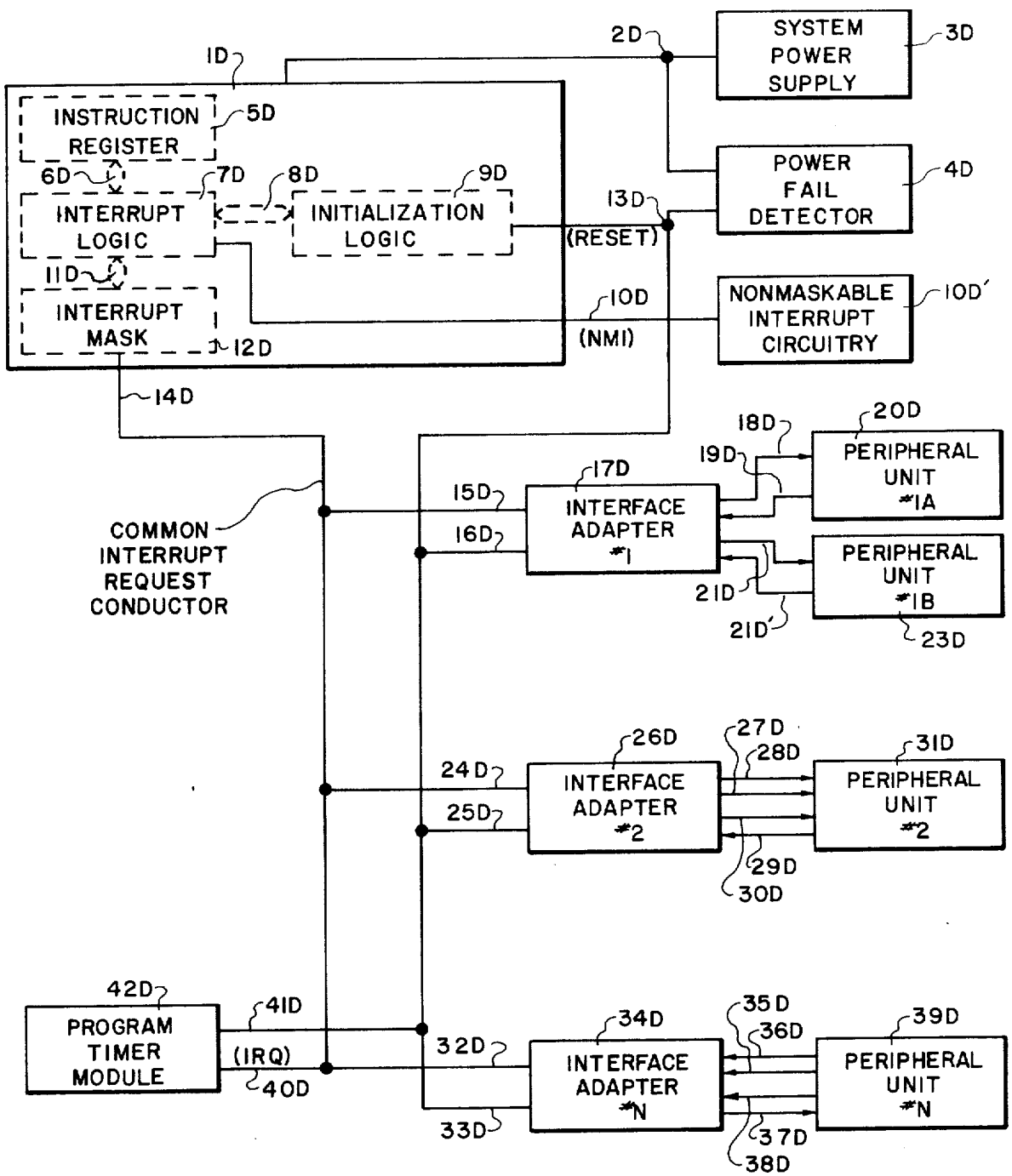
FIG. 3 is a partial block diagram of an MPU system showing an interrupt and reset/reinitialize organization.

FIG. 3 shows a partial view of a microprocessing system arranged to highlight the structure associated with the maskable interrupt, non-maskable interrupt and master reset/reinitialize features of the MPU system. In FIG. 3, data buses and address buses have been omitted for clarity. MPU chip 1D has as an input a common interrupt request conductor 14D which is connected to the other chips shown. Thus, conductor 14D is coupled to 15D, 24D, 32D, and 40D which are, respectively, reset inputs of first interface adaptor chip 17D, second interface adaptor chip 26D, Nth (where N is an integer) interface adaptor chip 34D and program timer module 42D. MPU chip 1D also has as an input conductor 10D which is connected to non-maskable interrupt circuitry 10D'. The MPU system power supply 3D provides power to the MPU chip via conductor 2D, which also is connected to power failure detector circuit 4D. Power failure detector circuit 4D also is connected to conductor 13D, which is a reset input conductor to the MPU chip 1D, first interface adaptor chip 17D via conductor 16D, a second interface adaptor chip 26D via conductor 25D, the Nth interface adaptor chip 34D via conductor 33D and the program timer module 42D via conductor 41D.

Internal to the MPU chip 1D, the common interrupt request conductor 14D is connected to interrupt mask circuit 12D. This interrupt mask circuit functions under program control to block out an interrupt request from any of the peripheral equipment devices of the system when the MPU is performing higher priority tasks. The interrupt mask circuit is coupled to the interrupt logic circuit via internal bus 11D. Thus when the interrupt mask is set, the common interrupt request conductor 14D cannot cause the required signals on bus 11D to initiate an interrupt sequence within the interrupt logic 7D. Interrupt logic 7D also is coupled to non-maskable interrupt conductor 10D. This conductor functions to provide for a higher priority class of interrupts which the MPU chip must respond to immediately, regardless of the data processing sequence it is performing. Thus this class of interrupts must not be masked, i.e., must be "non-maskable". Interrupt logic 7D also is coupled to internal bus 8D which is connected to initialization logic 9D. Initialization logic 9D is connected to reset conductor 13D. The function of 13D is to signal the MPU system that a system power malfunction has been detected by the power failure detector 4D and that all major system elements must be put in a "benign" state where there will be no catastrophic false manipulation of data within the chips of the system or false data transmission to the peripheral units controlled by the system. When the reset conductor changes to its active level in response to the detection of a power failure, the coupling of reset conductor 13D to initialization logic 9D causes a sequence of initialization signals to be generated which are then coupled to the interrupt logic 7D via internal bus 8D. The interrupt logic 7D then causes the MPU chip to perform the required instructions for establishing the "benign" state via internal bus 6D which is coupled to instruction register 5D of the MPU chip.

The interface adaptor chips of this system also have control conductors which are connected to peripheral units which each of them serve. Thus the first interface adaptor chip 17D is connected to a control conductor 18D which is an input to peripheral unit 1A, 20D and to an input control conductor 19D which is coupled to the same peripheral unit 20D. Similarly, the first interface adaptor chip 17D is connected to an output control conductor 21D which is connected to another peripheral unit 23D and to an input control conductor 21D' which is connected to the same peripheral unit. The second interface adaptor 26D has a different arrangement of control connections to the peripheral unit it serves, wherein it is coupled to three output control conductors 27D, 28D, and 30D, all of which are connected to peripheral unit 31D. Second interface adaptor chip 26D also is connected to an input control conductor 29D which is connected to peripheral unit 31D. The Nth interface adaptor chip 34D shows still another arrangement of control conductor connections to the peripheral unit it serves wherein it connects to three output control conductors 35D, 36D and 38D and to one input control conductor 37B, all of which are coupled to the Nth peripheral unit 39D. The different arrangements of control inputs and outputs shown for the interface adaptor chips of FIG. 3 are illustrative of the fact that the use of control registers within the interface adaptor chips allow control lines to the peripherals to be defined as inputs or outputs under program control.

Figure 4A:
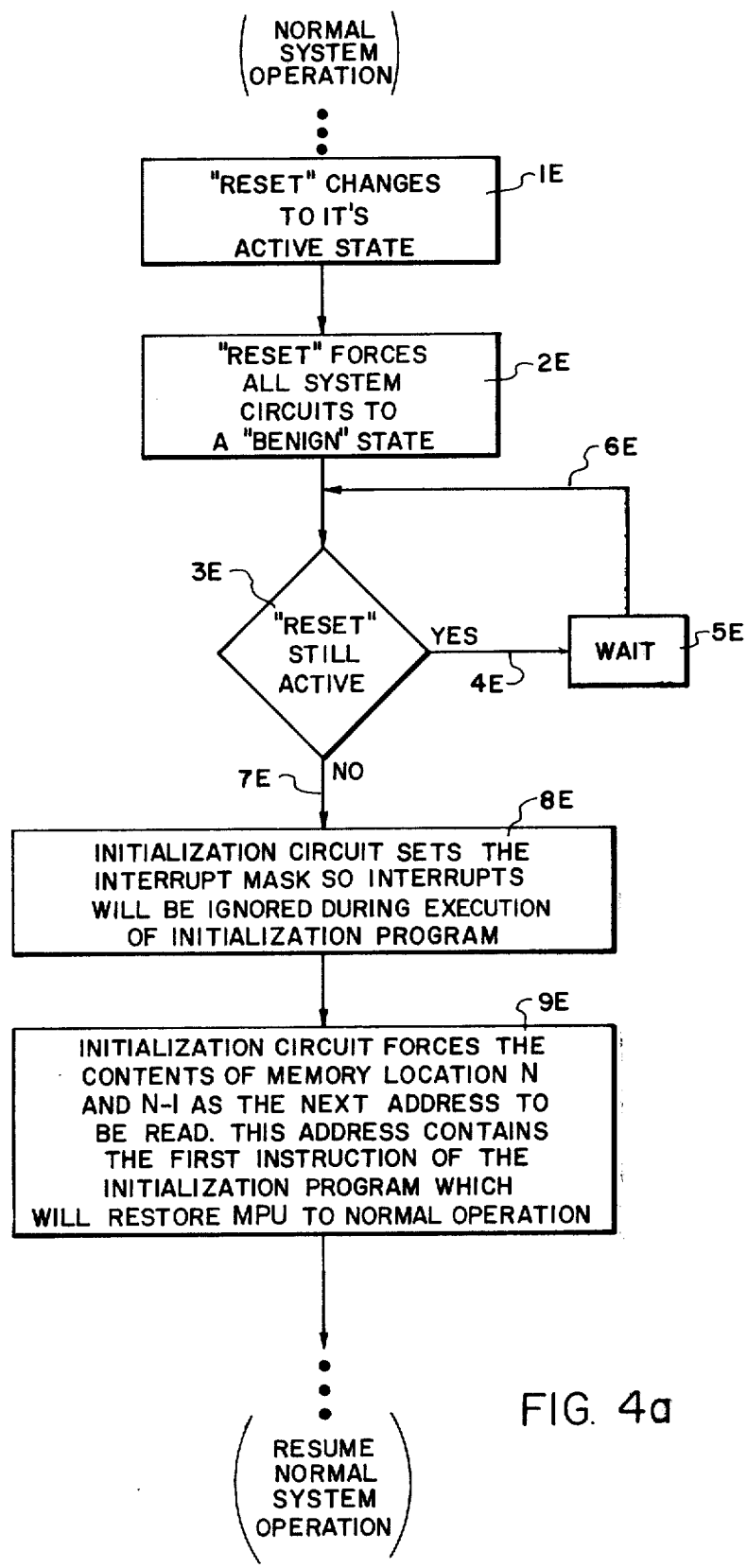
FIG. 4A is a flow chart showing steps in a reset/reinitialize sequence for a microprocessor.

FIG. 4A shows a flow chart of the basic MPU system actions that occur when the "master reset/reinitialize" conductor changes to its active state. Starting from normal system operation, the sequence is initiated when the reset conductor is changed to its active state as shown in block 1E. As previously shown in FIG. 3, the "master reset/reinitialize" conductor is connected to all system circuits so that the active level on the reset conductor input forces all system circuits to a "benign" state as shown by block 2E. In this "benign" state, the MPU system can safely wait until the reset conductor goes back to its inactive level as shown by block 3E, block 5E and the interconnecting arrows 4E and 6E in the flow chart. When the reset conductor changes back to the inactive state the MPU system is ready to move into a reinitialization sequence as shown by arrow 7E. In this sequence the initialization circuit forces the contents of the last two locations in memory, N and N-1, as the next address memory to be read by the MPU. This address contains the first instruction of the initialization program which restores the MPU system to normal operation when executed. This step is shown by block 9E of the flow chart. Prior to executing the initialization sequence, the initialization circuit sets the interrupt mask 12D previously described for FIG. 3 so that all interrupts will be ignored during the execution of the initialization program. When the execution of the initialization program is complete, the MPU system resumes normal system operation.

Figure 4B:
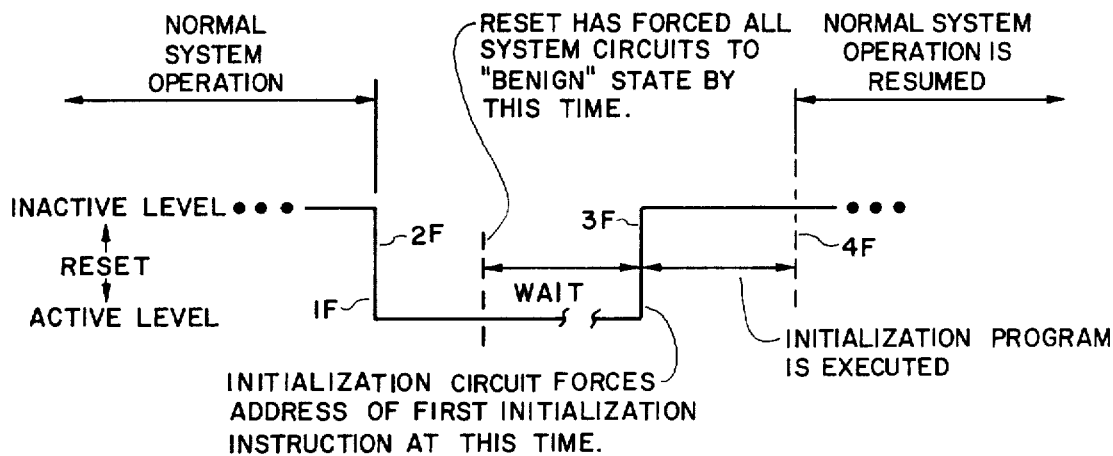
FIG. 4B is a timing diagram for a reset/reinitialize sequence for a microprocessor.

FIG. 4B shows the timing diagram of the reset conductor for the sequence of system operations described in FIG. 4A.

Figure 4C:
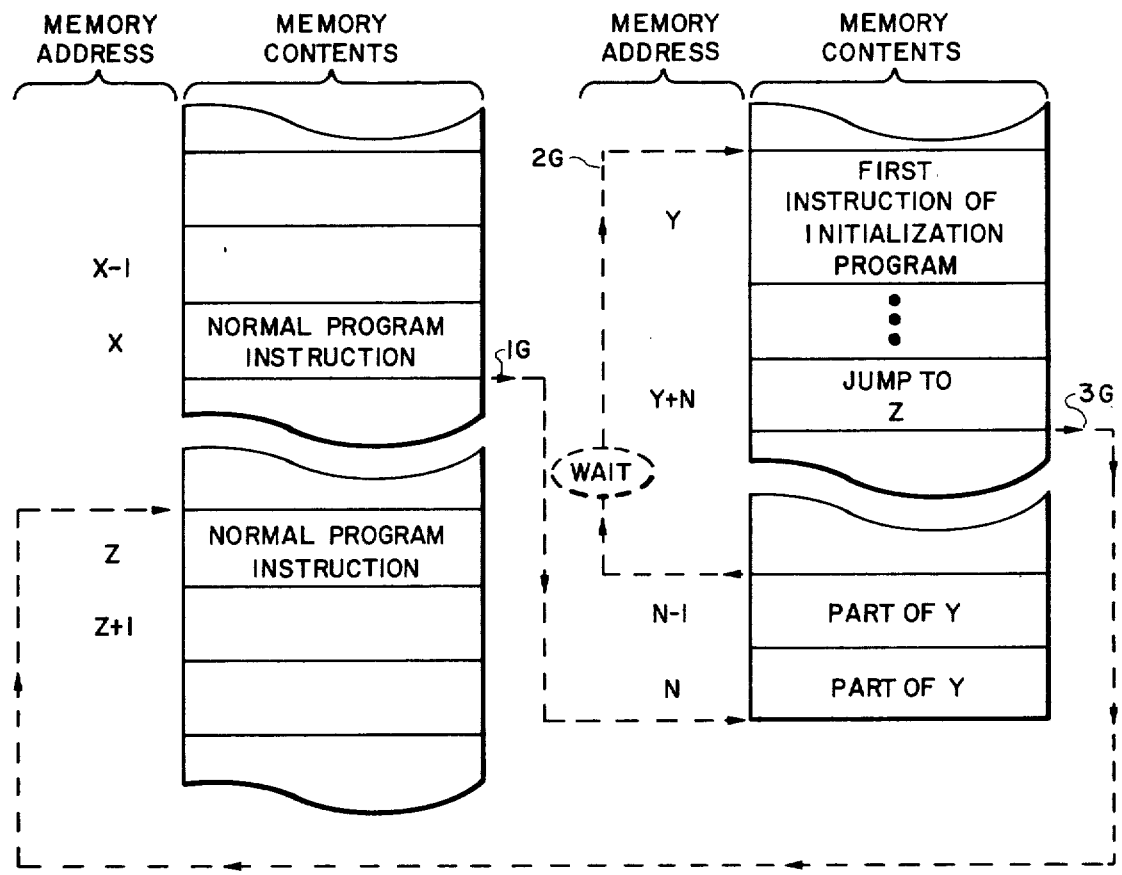
FIG. 4C is a memory map for the reset reinitialize sequence for a microprocessor.

FIG. 4C shows a partial memory map of the MPU program illustrating the various groups of memory locations involved in the reset and reinitialization sequence shown by the flow chart of FIG. 4A.

Figure 5:
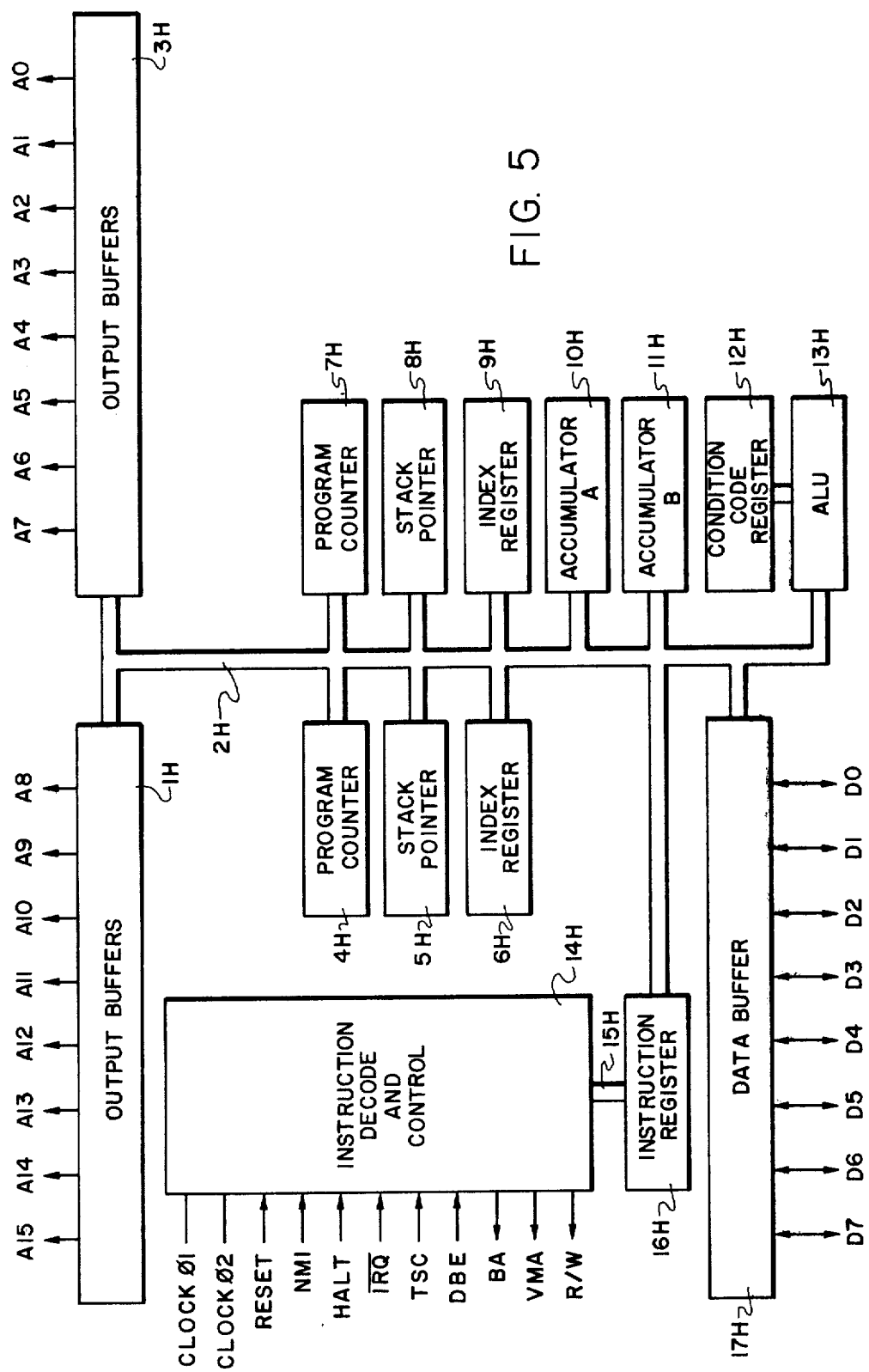
FIG. 5 is a logic diagram of a microprocessor chip unit.

FIG. 5 is a block diagram of an MPU chip showing the major functional elements which allow it to execute stored program instructions and transmit and receive data and control information from another chip in the MPU system. Central to the structure of the MPU chip is bidirectional internal bus 2H which is coupled to the major registers and buffers which must communicate in order to process instructions and data. Bus 2H is coupled to program counters 4H and 7H, stack pointer registers 5H, 8H, index registers 6H, 9H, A accumulator 10H, B accumulator 11H, condition code register 12H, arithmetic logic unit (ALU) 13H, and instruction register 16H. Bus 2H also is coupled to address output buffers 1H and 3H, and to data buffer 17H. Data buffer 17H is coupled to eight data bus conductors D0–D7 of the bidirectional data bus which has the function of transmitting and receiving data to and from other chips of the MPU system. Address output buffers 3H, 1H are coupled to sixteen address bus conductors A0–A15, which allow the MPU chip to select the address location assigned to the memory and other chips of the MPU system. The register arrangement shown in FIG. 5 illustrates the structure of the MPU chip as a "byte" organized processor, so that the sixteen bit program counter is shown as program counter 7H which contains the low eight bits and program counter 4H which shows the high order eight bits. Stack pointer registers 8H and 5H and index registers 9H and 6H show the same structural division.

In addition to executing stored program instructions, the MPU chip alters the data processing sequence of the system in response to various control inputs and accordingly generates other control outputs. Those functions are performed by the control portion of the instruction decode and control circuit 14H. The instruction decode and control circuit 14H is coupled to the clock conductors $\phi 1$ and $\phi 2$, the reset input conductor, the non-maskable interrupt (NMI) conductor, the halt conductor, the interrupt request ($\overline{IRQ}$) conductor, the prestate control (TSC) conductor, the data bus enable (DBE) input conductor, the bus available (BA) output conductor, the valid memory address (VMA) output conductor and the read/write (R/W) output conductor. Instruction decode and control circuit 14H also is coupled to the instruction register 16H via bus 15H. It is this interconnection which allows the stored program instructions to be transmitted to instruction register 16H from the bidirectional data bus via internal data bus 2H. These instruction are decoded by the instruction decode and control circuit 14H to generate the appropriate sequence of internal signals and register operations.

Figure 6:
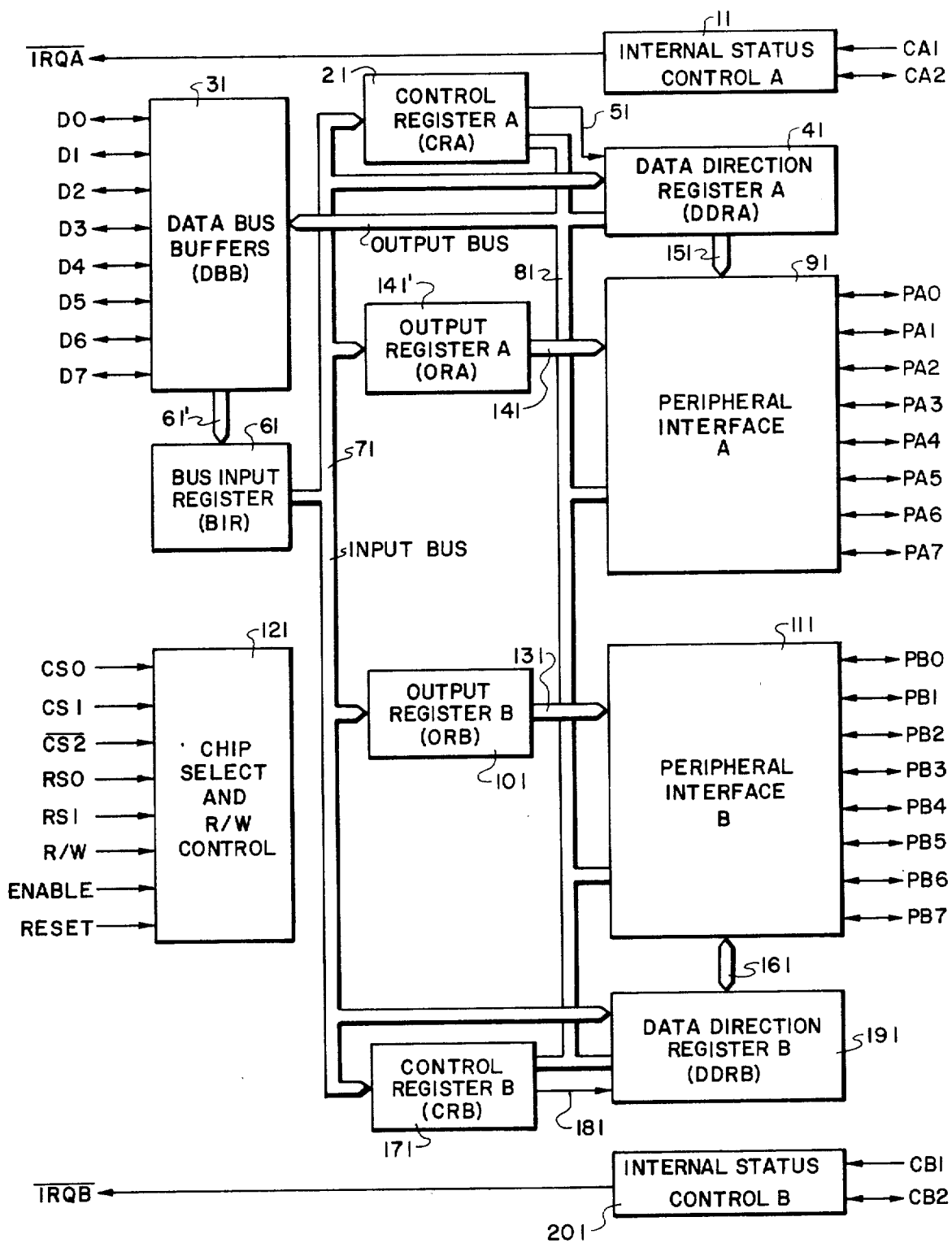
FIG. 6 is a block diagram of a peripheral interface adaptor.

FIG. 6 is a block diagram of a peripheral interface adaptor circuit showing the major functional elements involved in adapting and controlling peripheral units of the MPU system. The eight conductors D0–D7 of the MPU data bus are connected to the data bus buffer circuit 3I, which in turn is connected to bus input register 6I via the internal bus 6I' and to the output bus 8I. Data and control words from the MPU data bus are transmitted via data bus buffer circuit 3I and are stored in bus input register 6I pending transfer to the other registers of the PIA chip. This transfer is accomplished via input bus 7I which is coupled to the bus input register 6I and is coupled to the A control register 2I, the A output register 14I', the B output register 10I, the A direction register 4I, the D data direction register 19I, and the B control register 17I. The output portion of the PIA chip is divided into two sections—the "A" side and the "B" side. Thus, the eight conductors PA0–PA7 of the bidirectional peripheral bus "A" are coupled to peripheral interface circuit A 9I and the eight conductors PB0–PB7 of the bidirectional peripheral bus "B" are coupled to the peripheral interface circuit B, 11I. The peripheral interface circuits both are coupled to output bus 8I which is coupled to A control register 2I, A data direction register 4I, data bus buffers circuit 3I, B control register 17I, and B data direction register 19I. The connections of output bus 8I allow data received from the peripheral units to be transferred from the peripheral interface circuits to the various registers of the PIA chip and ultimately, via the data bus buffer circuitry 3I to the MPU chip of the MPU system.

The PIA chip also contains internal status control circuits which function to transmit and receive control signals from the MPU chip to the peripheral device and to relay interrupt request signals from the peripheral device to the MPU chip. The A internal status control circuit 1I is coupled to the peripheral unit via control conductors CA1 and CA2 and also is coupled to the MPU chip via the interrupt request conductor $\overline{IRQA}$. Similarly, the B internal status control circuit 20I is coupled to the peripheral unit via control conductors CB1 and CB2 an also is coupled to the MPU chip via the interrupt request conductor $\overline{IRQB}$.

The PIA chip also contains chip select and read/write control circuit 12I which is coupled to conductors CS0, CS1, $\overline{CS2}$, RS0, RS1 R/W, Enable, and Reset, which transmit control signals from the MPU chip. The chip select and read/write control circuit generates internal register selection and circuit timing signals which act as control signals for the other registers of the PIA chip. For clarity, the various conductors for these signals have been omitted from FIG. 6.

Figure 7:
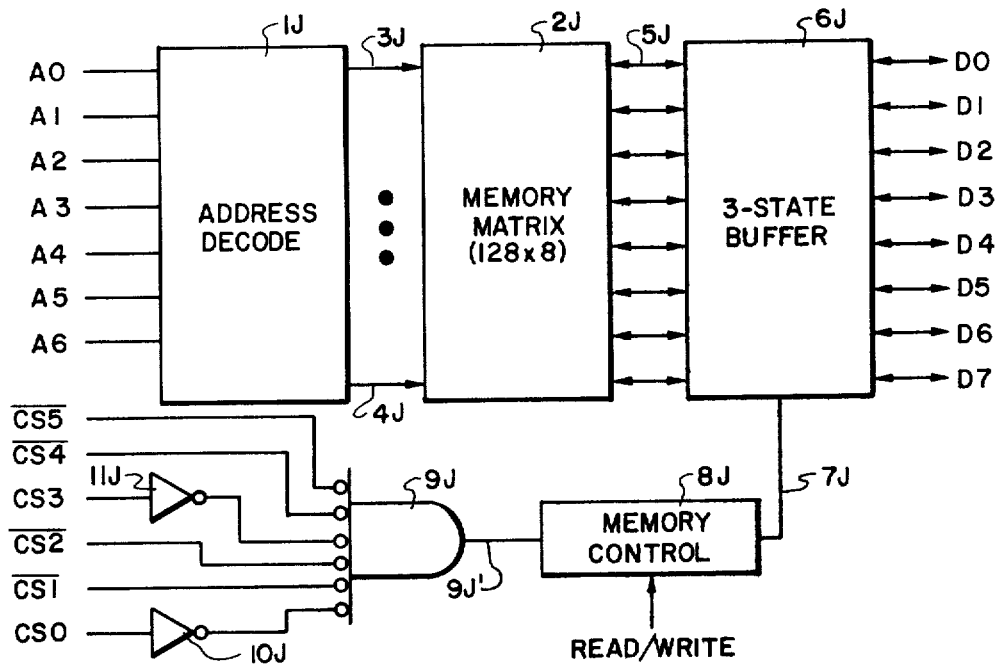
FIG. 7 is a functional block diagram of a random access memory for use in a microcomputer system in FIG. 1B.

FIG. 7 shows a functional block diagram of a typical random access memory (RAM). The particular RAM shown in this figure is organized as 128 words of eight bits per word. The selection of a particular word is accomplished by a unique combination of address signals on the seven address conductors A0–A6 which are coupled to the address decode circuit 1J. The output of address decode circuit 1J are the 128 word select conductors 3J–4J which are coupled to memory matrix 2J. When selected, the eight memory cells form the selected word are either read from or written onto via the eight bit conductors 5J which are connected to three-state buffer 6J. Three-state buffer 6J is coupled to the data bus of the MPU system via the eight data bus conductors D0–D7 and also is coupled to the memory control circuit 8J via conductor 7J. The function of the three-state buffer is to present a very high impedance to the eight data bus conductors D0–D7 during those times when the RAM is not being accessed so that the data bus connections to the RAM do not load the MPU system data bus.

The additional address selection required to define when a particular RAM is to be active is provided by chip select conductors CS0, $\overline{CS1}$, $\overline{CS2}$, CS3, $\overline{CS4}$, and $\overline{CS5}$. These six conductors are coupled to the six input NAND gates 9J with conductor CS3 being coupled via inverter 11J and conductor CS0 being coupled via inverter 10J. When selected, the output of NAND gate 9J transmits a logical "1" to a memory control circuit 8J via conductor 9J'. The memory control circuit AJ also is coupled to the read/write conductor from the MPU chip with the result that the required control signal levels are transmitted to the the three-state buffer 6J via conductor 7J.

Figure 8:
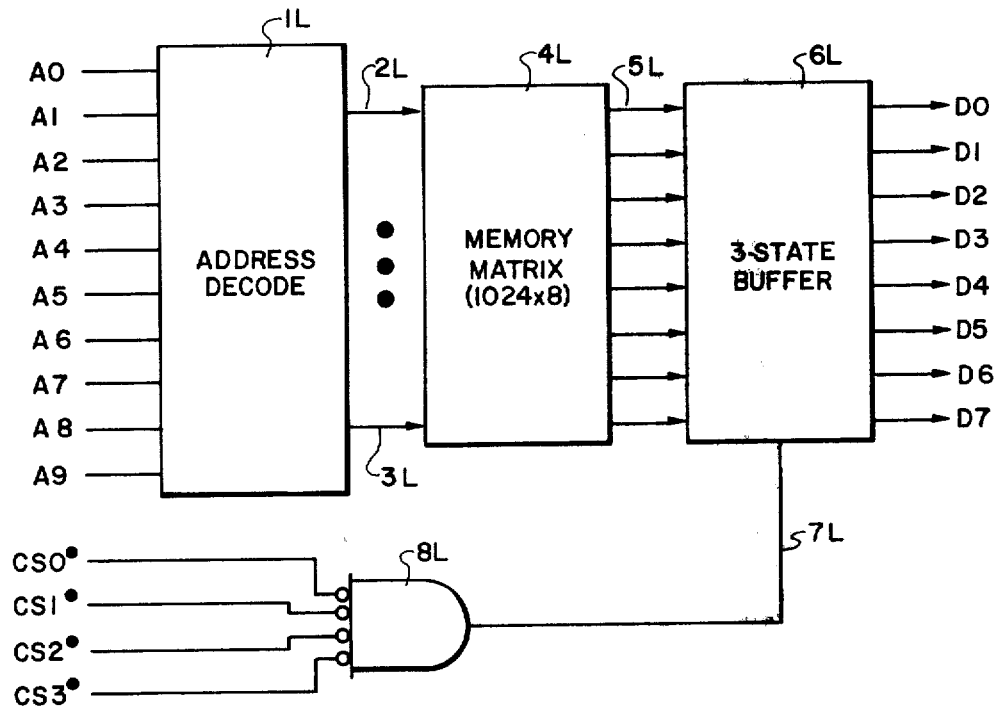
FIG. 8 is a functional block diagram of the 1024×8 read only memory which may be used in the system of FIG. 1B.

FIG. 8 shows a functional block diagram of a typical read only memory (ROM) used in the MPU system. The particular ROM shown in FIG. 8 contains 8,192 bits of information organized as 1,024 words of eight bits per word. The functional organization of the ROM is very similar to that of the RAM previously described in FIG. 7. Ten address conductors (A0–A9) of the MPU system address bus are coupled to an address decode circuit 1L. The word selection outputs 2L–3L of the address decode circuit 1L are coupled to the memory matrix 4L. The selected word of the memory in the memory matrix 4L then produces data signals on the eight bit line conductors 5L which are coupled from the memory matrix 4L to the three-state buffer circuit 6L. The control input for the three-state buffer 6L is provided by conductor 7L which is coupled to the four input NAND gate 8L. The four chip select conductors CS0–CS3 provide the additional selection information required to select a given ROM chip and also determine the correct signal for the three-state buffer circuit 6L via the coupling of conductors 7L. The output of three-state buffers 6L is coupled to the eight data conductors D0–D7 of the MPU system data bus so that the selection of a particular word in the ROM chip results in the appropriate signals on the eight data conductors D0–D7. Three-state buffer circuit 6L also responds to control signals on conductor 7L to present a high impedance to the eight data bus conductors D0–D7 when the ROM is in its unselected state.

Figure 9A:
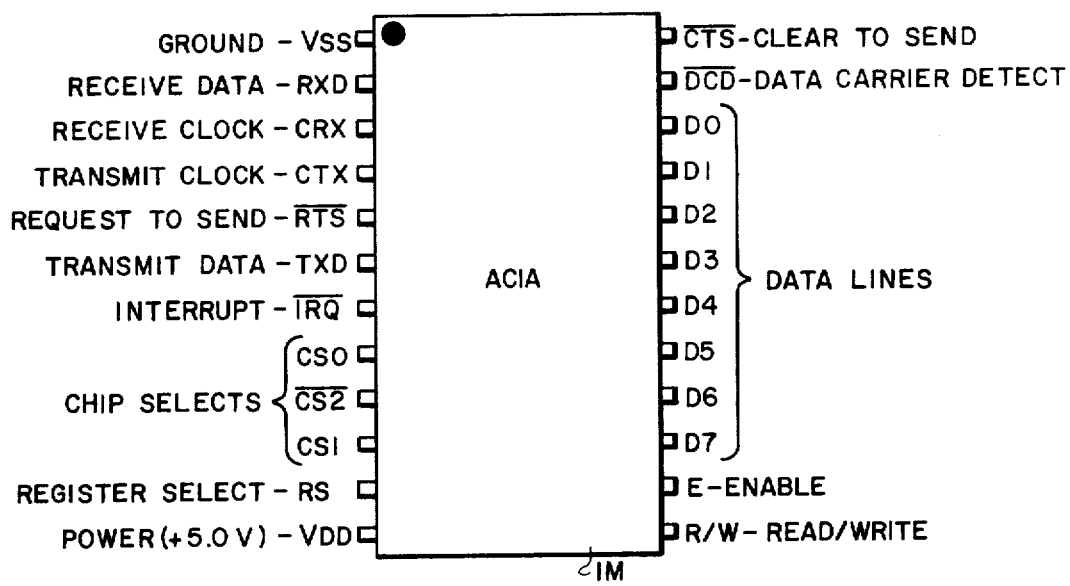
FIG. 9A is a block diagram showing an asynchronous communications interface adaptor's signal line designations.
Figure 9B:
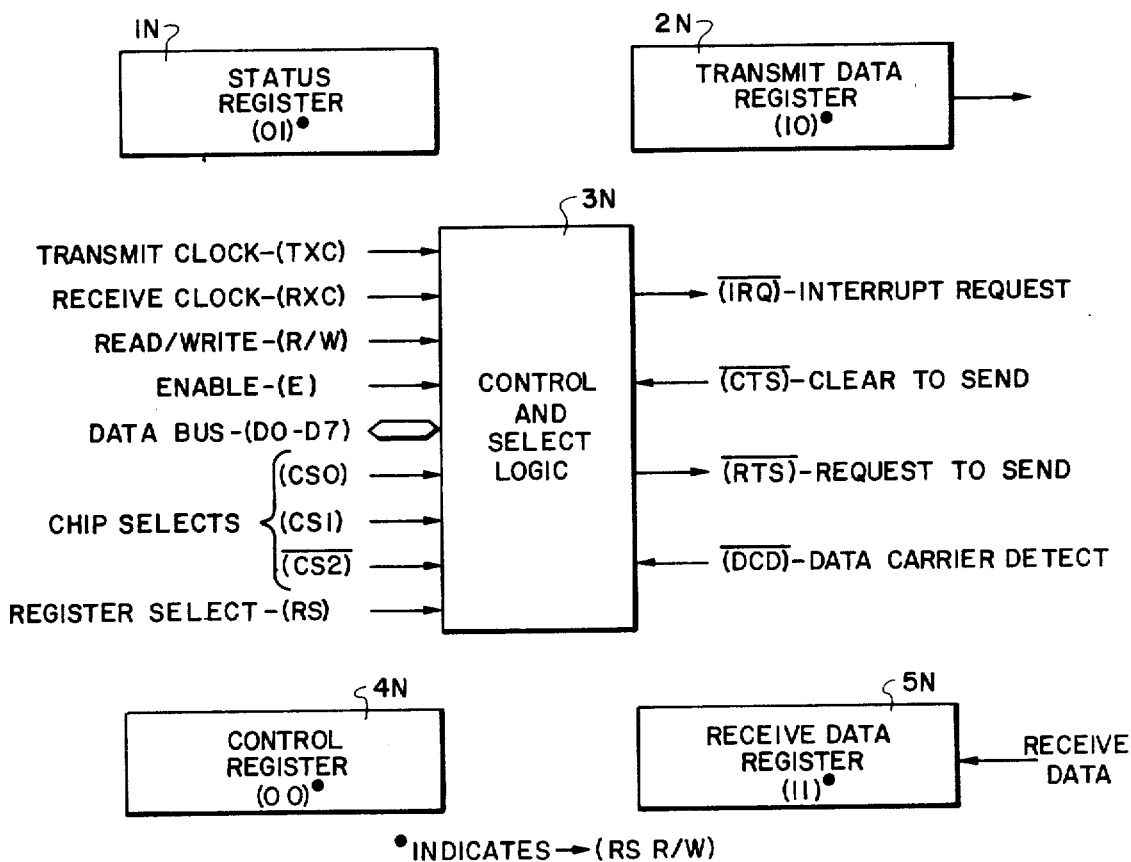
FIG. 9B is a functional block diagram of an asynchronous communications interface adaptor which may be used in the system of FIG. 1B.

FIG. 9A and FIG. 9B relate to the asynchronous communications circuit adaptor (ACIA), another type of adaptor circuit used to interconnect a particular class of peripheral units to the MPU system. FIG. 9A shows a block diagram summarizing the input and output conductors which are connected to the ACIA. The basic function of the ACIA chip is to receive and transmit serial asynchronous data via conductors RXD and TXD and to perform the appropriate control functions, parallel to serial or serial to parallel conversion required for compatibility with the eight data conductors D0–D7 of the MPU system data bus which must operate synchronously. Address selection is accomplished by conductors CS0, $\overline{CS2}$, CS1, and RS which are connected to the address bus of the MPU system. The ACIA chip also has conductor CRX and $\overline{CTX}$ to transmit and receive clock and conductors $\overline{DCD}$, $\overline{CTS}$, and $\overline{RTS}$ which are coupled to the associated modem or peripheral device. The ACIA chip also has an interrupt request conductor $\overline{IRQ}$ for transmitting interrupt requests to the microprocessor chip as previously discussed in FIG. 3 and the control conductors E and R/W which are coupled to the MPU chip.

FIG. 9B shows a functional block diagram of the ACIA showing the basic logic and register elements used and repeating the conductor connections previously discussed for FIG. 9A. The basic registers of the system are the status register 1N, the transmit data register 2N the control register 4N and the receive data register 5N. In addition the ACIA chip contains a control and select logic circuit which produces the appropriate internal control signals in response to the control conductors previously discussed in FIG. 8. A more detailed description of the function of each of the conductors which are coupled to the ACIA chip and the ACIA chip overall operation are given below.

PROGRAMMING MODEL OF MPU SYSTEM

Figure 10:
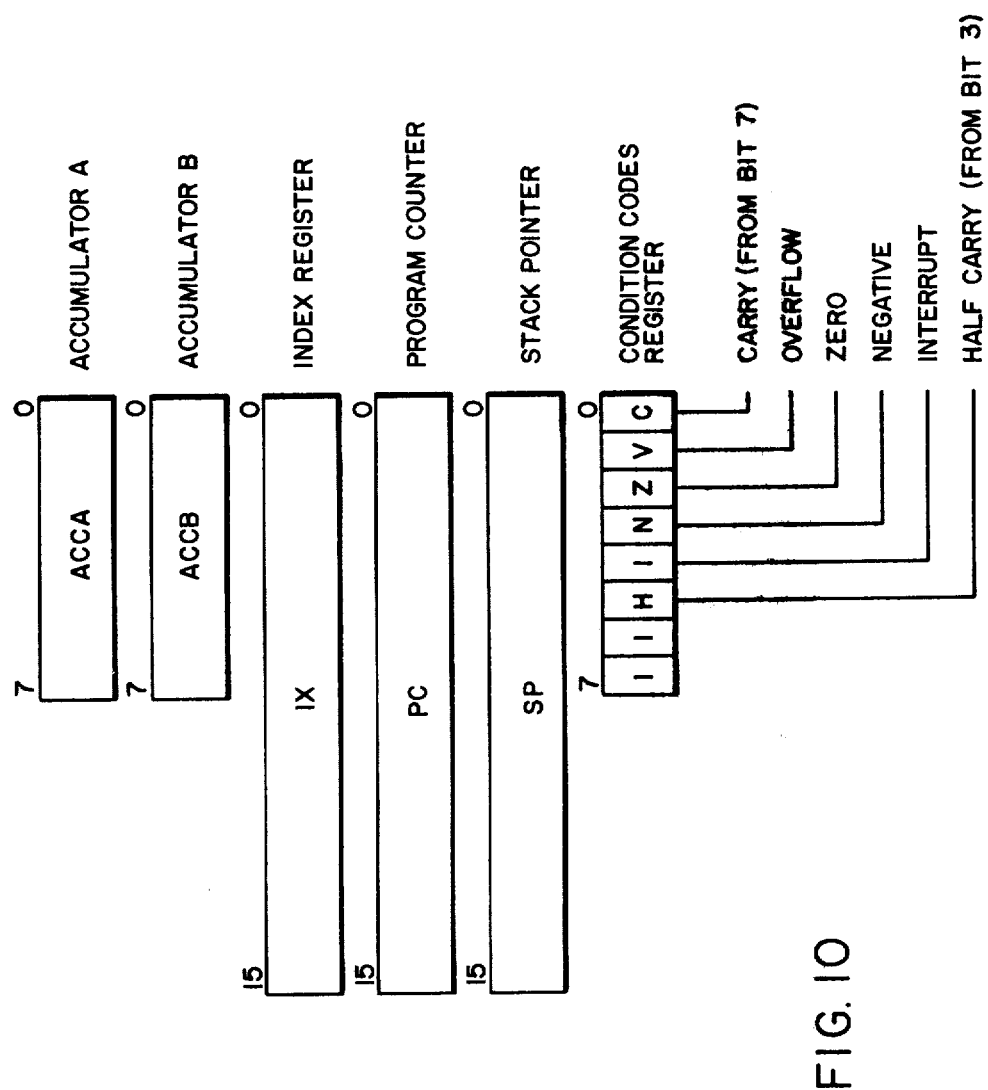
FIG. 10 is a programming model of a microprocessing unit according to the invention.

FIG. 10 shows a programming model of the microprocessor unit (MPU) in terms of the major registers and counters involved in the execution of program instructions. The basic elements of this model are the two eight bit accumulators A and B designated ACCA and ACCB, the sixteen bit index register designated IX, the sixteen bit program counter designated PC, and ACCB, the sixteen bit stack pointer designated SP and the eight bit condition code register which records the system state at the various stages of an MPU data processing operation. A more detailed description of these elements of the programming model and the way in which they interact in performing a MPU program instruction is given in greater detail below.

MINIMUM SYSTEM CONFIGURATION

Figure 11:
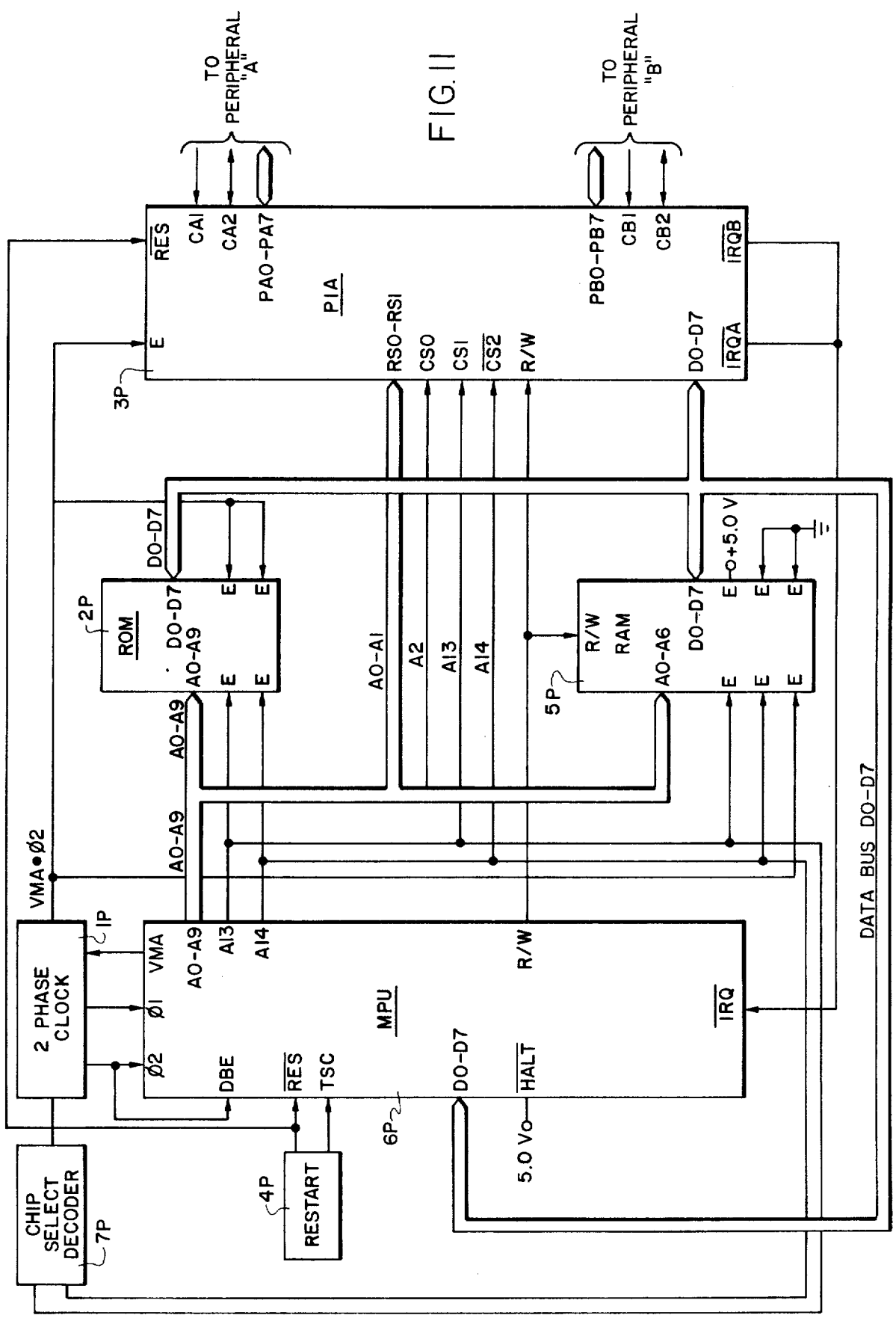
FIG. 11 is a minimum configuration for a microprocessor system.

FIG. 11 shows a mininum configuration for an MPU system including the detailed interconnection of the various chips and circuits in the system. MPU chip 6P is connected to conductor TSC for three-state control and to conductor $\overline{RES}$ for reset. Both of these conductors are coupled to restart circuit 4P, which is used to generate the reset and three-state control signals in this particular case. The MPU chip 6P is coupled to the two phase clock generator circuit via clock conductors $\phi1$ and $\phi2$ and provides a "valid memory address" signal to the two phase clock circuit 1P via conductor VMA. Conductor $\phi2$ also is connected to the data bus enable (DBE) input of the MPU in this particular case.

For this particular configuration the MPU chip makes use of the ten address conductors A0–A9 and address conductors A13 and A14. The ten address conductors A0–A9 are connected to the ROM 2P and the seven conductors A0–A6 are connected to the RAM 5P. In addition, address conductor A13 is connected to one enable input of ROM 2P and one enable input of RAM 5P. Similarly, address conductor A14 is connected to another enable input of ROM 2P and another enable input of RAM 5P. Address conductors A13 and A14 further are connected, respectively, to the CS1 and $\overline{CS2}$ inputs to the PIA chip 3P. Address conductors A0, A1, and A2 from the ten conductor group A0–A9 are connected, respectively, to inputs RS0, RS1, and CS0 of the PIA chip 3P. Address conductors A13 and A14 also are connected to the chip select decoder circuit 7P which is coupled to an input to the two phase clock circuit 1P. A function of the chip select decoder circuit is the recognition of particular address combinations for which the system operation requires an "expansion" of a $\phi2$ clock pulse length. When these combinations are decoded the output of the chip select decoder 7P is coupled to the "programmable" input of the two phase clock circuit 1P, indicating that the length of a $\phi2$ clock pulse should be expanded.

MPU chip 6P also produces a "valid memory address" signal on conductor VMA which is coupled to two phase clock circuit 1P. The "valid memory address" signal indicates that during a given clock cycle the address bus is being utilized by the MPU for addressing information from memory. The two phase clock circuit 1P contains logic which combines the valid memory address signal with the phase two clock signal to produce the logical AND signal of these two signals, which logical AND signal is coupled to conductor VMA.$\phi2$, which in turn is coupled to an enable input of the RAM chip 5P and an enable input of the PIA chip 3P to provide the basic timing for these two chips.

The MPU chip is coupled to the eight data conductors D0–D7 of the bidirectional data bus which in turn is coupled to RAM chip 5P, ROM chip 2P, and the PIA chip 3P, providing the basic bidirectional data transmission path for the system. The MPU chip also has a go/halt ($\overline{HALT}$) input, which for this minimum system configuration is coupled directly to a five volt power supply to provide a steady state "go" condition.

PIA chip 3P of this minimum system configuration is arranged to connect to two peripheral devices "A" and "B". Control inputs and outputs to peripheral "A" are coupled to PIA chip 3P via conductors CA1 and CA2.

Similarly, control conductors peripheral from "B" are coupled to PIA chip 3P via conductors CB1 and CB2. Data transfer to and from the two peripheral units is provided by the eight conductor peripheral bus PA0–PA7 and the eight conductor peripheral bus PB0–PB7, each of which is coupled between the associated peripheral unit and the PIA chip 3P. Interrupt request signals are derived from control signals on CA1, CA2, CB1, and CB2 and are transmitted to the MPU chip via conductors $\overline{IRQA}$ and $\overline{IRQB}$ which multiplex to the common interrupt request conductor $\overline{IRQ}$ which is coupled to the MPU chip.

Figure 12:
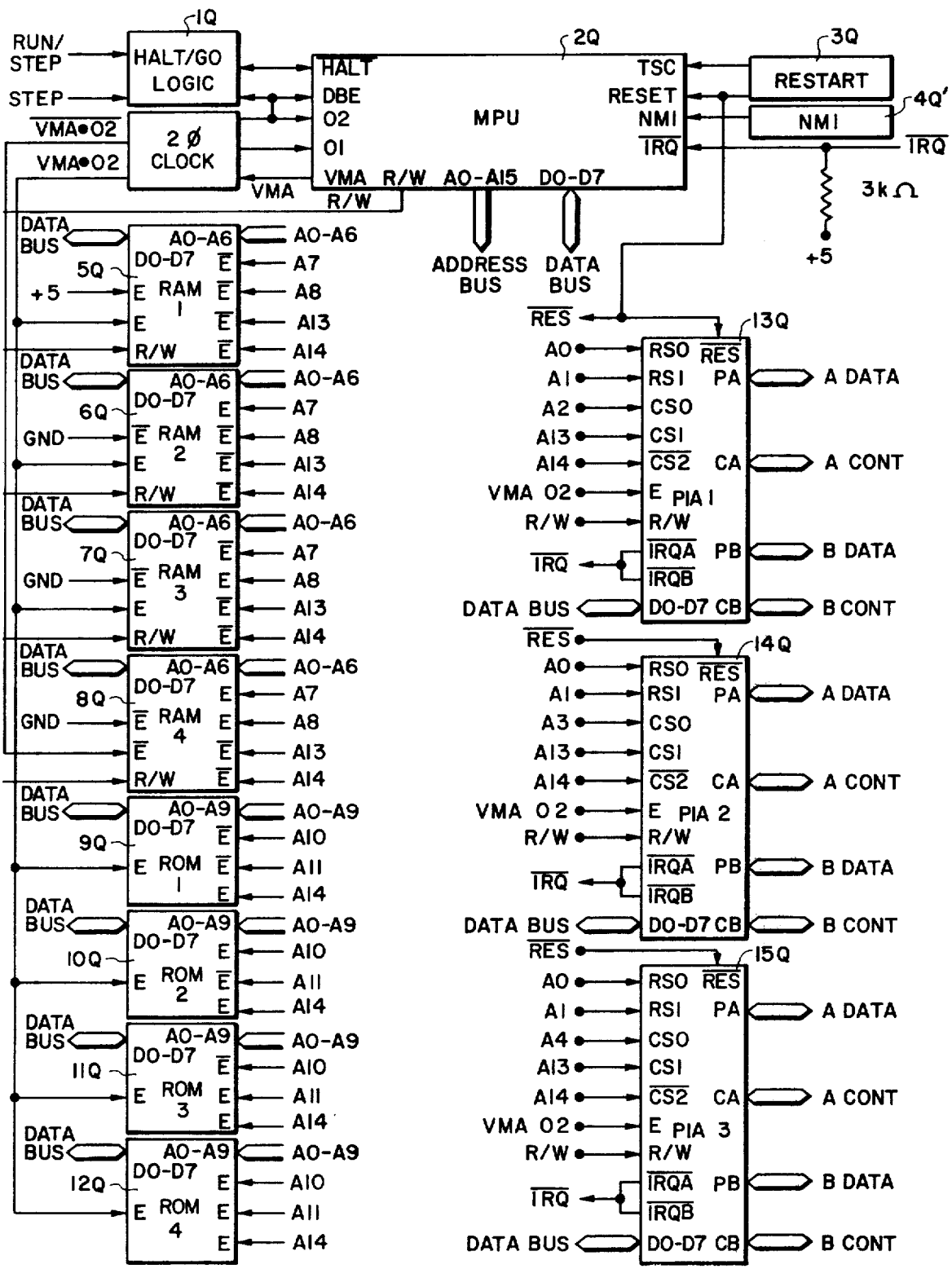
FIG. 12 is a typical configuration for a microprocessor system.

FIG. 12 shows the block diagram of an expanded MPU system. The mode of interconnection and the functions of the various elements of the system are the same as previously recited for FIG. 11 except that the system has been expanded for this case. MPU chip 2Q now is connected to four RAM chips, 5Q, 6Q, 7Q and 8Q, four ROM chips 9Q, 10Q, 11Q and 12Q and three PIA chips 13Q, 14Q and 15Q.

SYSTEM INTERRUPTS

Regarding differences from the system shown in FIG. 11, the system power supply and the power failure detector have been omitted for simplicity, and non-maskable interrupt circuit 4Q' and the halt/go logic 1Q have been added. Non-maskable interrupt circuit 4Q' interrupts the MPU chip's normal operation sequence via the MMI input during catastrophic system malfunctions which require immediate MPU chip action. The halt/go logic circuit 1Q allows the MPU system to be operated in a manual or "step-by-step" mode via signals on the run/step conductor and the step conductor, which is coupled to the halt/go logic circuit 1Q. The system block diagram of FIG. 12 also omits the chip select decoder which was used for expansion of the $\phi 2$ clock in FIG. 11. Also, in FIG. 12, the common interrupt request conductor $\overline{IRQ}$ is coupled to a pullup resistor which is coupled to the +5 volt power supply and is coupled to the $\overline{IRQA}$ and $\overline{IRQB}$ inputs of the three PIA chips 13Q, 14Q, 15Q.

If the elements of FIG. 1B are implemented as a family of monolithic integrated circuits fabricated in the N-Channel Silicon Gate technology, many features result which offer technical advantages and system economies to the user. The invention associated with these features is recited in specific detail later in this application. At this initial stage of the system description, it is useful to list some, but not really all, of these features including:

Eight-bit parallel processing,
Bi-directional data bus,
Sixteen-bit address bus-65 K bytes of addressing,
72 instructions-Variable length,
Seven addressing modes-Direct, Relative, Immediate, Indexed, Extended, Implied and Accumulator,
Variable length stack,
Power-on restart,
Maskable interrupt vectoring,
Separate Non-maskable Interrupt-Internal, registers saved in stack,
Six Internal Registers, Two Accumulators,
Index Register, Program Counter, Stack Pointer and Condition Code Register,
Direct Memory Addressing (DMA) and multiple processor capability,
Clock rates as high as 1 MHz,
Simple interface with TTL,
Halt/Go and single instruction execution capability

MPU OPERATION

The following discussion provides further orientation on the basic elements of the MPU system and how they functionally interrelate.

The Microprocessor Unit (MPU) performs the basic control functions for the MPU System by executing the internal or external data manipulations required by the programs stored in the MPU system memory. FIG. 2 shows a basic block diagram of the internal logic elements of the MPU which accomplish this. FIG. 2 also shows the various electrical signal lines required for the MPU to operate and communicate with the other integrated circuits (IC's) of the system. Referring to FIG. 5, a basic description of the MPU's internal logic elements is as follows.

The output buffer registers 1H and 3H hold the address of the memory location whose contents are required for a given MPU operation and transmit it to that location via the system address bus.

The data buffer 17H holds the data required for or resulting from, a given MPU operation. Data from external data sources or received from external data destinations enters this register via the system data bus.

The instruction register 16H holds the program instruction received from the MPU system memory pending interpretation by the Instruction Decode and Control Circuit.

The instruction decode and control circuit 14H interprets (i.e., decodes) the program instruction entering the MPU from a system memory and generates control signals needed to manipulate data contents of the various MPU registers.

The program counter 4H, 7H which is a counter/register, holds the address of the next memory location required by the stored program for a given MPU operation as indicated by the results of decoding a given instruction.

The stack pointer 5H, 8H register contains the address of a special location in system memory which must be retained while the MPU performs other sequences of operations.

The index register 6H, 9H contains data used to modify the system memory address specified in the Program Counter for certain classes of MPU operations.

The accumulator registers 6H and 9H provide a temporary storage location for data as it is manipulated during a given MPU operation.

The condition code register 12H maintains a record of special conditions required or generated by certain classes of MPU system operations that imply a change in the way data is to be manipulated.

The arithmetic logic unit (ALU) 13H contains logic required to perform arithmetic data manipulations such as addition when they are required by a given MPU operation.

A basic description of the MPU's electrical signal lines follows.

The $V_{DD}$ and $V_{SS}$ lines provide the DC power required by the MPU circuit. Typically, $V_{DD}=+5$ volts and VSS=0 volts.

The phase one clock ($\phi 1$) and phase two clock ($\phi 2$) are non-overlapping clocks that run at the $V_{DD}$ voltage level. Sixteen pins are used for the address bus (A0–A15). The outputs are three-state bus drivers capable of driving one standard TTL load and 30 pf or one low power TTL load and 130 pf. When the output is turned off, it is essentially an open circuit. This permits the MPU to be used in DMA applications. For further discussion of TTL circuits, see "Analysis and Design of Integrated Circuits", edited by Lynn, et al, McGraw Hill Book Co., 1967.

Eight pins are used for the data bus (D0-D7). It is bidirectional, transferring data to and from the memory and peripheral devices. It also has three-state output buffers capable of driving one standard TTL load and 30 pf or one low power TTL load and 130 pf.

When the halt/go, or halt input is in the high state, the machine will fetch the instruction addressed by the program counter and start execution. When low, all activity in the machine will be halted. This input is level sensitive. In the halt mode, the machine will stop at the end of an instruction, the Bus Available line will be at a logical one level, Valid Memory Address will be at a logical zero, and all other three-state lines will be in the high impedance or three-state mode.

The halt line must go low with the leading edge of phase one to insure single instruction operation. If the Halt line does not go low with the leading edge of phase one, one or two instruction operations may result, depending on when the halt line goes low relative to the phasing of the clock.

The three-state control (TSC) input causes all of the address lines and the Read/Write line to go into the off or high impedance state. The Valid Memory address and Bus Available signals will be forced low. The data bus is not affected by TSC and has its own enable (Data Bus Enable). In DMA applications, the Three-State Control line should be brought high on the leading edge of the Phase One Clock. The $\phi 1$ clock must be held in the high state for this function to operate properly. The address bus will then be available for other devices to directly address memory. Since the MPU is a dynamic device, it must be refreshed periodically or destruction of data will occur in the MPU.

The read/write (R/W) output signals the peripherals and memory devices whether the MPU is in a Read (high) or Write (low) state. The normal standby state of this signal is Read (high). Three-State Control (TSC) going high will cause Read/Write to go into the off (high impedance) state. Also, when the machine is halted, it will be in the off state.

The valid memory address (VMA) output indicates to memory and peripheral devices that there is a valid address on the address bus. In normal operation, this signal should be ANDed with $\phi 2$ for enabling memory and peripheral interface devices such as the PIA and ACIA. This signal is not a three-state signal, one standard TTL load may be directly driven by this active high signal.

The data bus enable (DBE) input is a three-state control signal for the MPU (external) data bus and will enable the bus drivers when in the high state. This input is TTL compatible; however in normal operation, it should be driven by $\phi 2$. During an MPU read cycle, the data bus drivers will be disabled internally. When it is desired that another device control the data bus such as in Direct Memory Access (DMA) applications, DBE should be held low.

The interrupt request ($\overline{IRQ}$) input requests that an interrupt sequence be generated within the machine. The microprocessor (or processor) will wait until it completes the current instruction that is being executed before it recognizes the request. At that time, if the interrupt mask bit in the Condition Code Register is not set (i.e., interrupt masked), the machine will begin an interrupt sequence. The Index Register, Program Counter, Accumulators, and Condition Code Register are then stored away on the stack during the interrupt sequence. Next the MPU will respond to the interrupt request by setting the interrupt mask bit high so that no further interrupts may occur. At the end of the cycle, a 16-bit address will be loaded that points to a vectoring address which is located in memory locations N6 and N7. An address located at these locations causes the MPU to branch to an interrupt routine in memory.

The Go/Halt line must be in the Go(high) state for interrupts to be recognized. If it is in the Halt(low) state, the MPU will be halted and interrupts will have no effect.

The bus available (BA) signal will normally be in the low state; when activated, it will go to the high state indicating that the microprocessor has stopped and that the address bus is available. This will occur if the Go/Halt line is in the Halt (low) state or the microprocessor is in the WAIT state as a result of the execution of a WAIT instruction. At such time, all three-state output drivers will go to their off state and other outputs to their normally inactive level. The microprocessor is removed from the WAIT state by the occurrence of a maskable or non-maskable interrupt.

The rest input is used to state the MPU from a power down condition, resulting from a power failure or an initial start-up of the microprocessor. If a positive edge is detected on the input, this will signal the MPU to begin the restart sequence. This will restart the MPU and start execution of a routine to initialize the microprocessor. All the higher order address lines will be forced high. For the restart, the last two (n-1, n) locations in this area will be used to load the program that is addressed by the program counter.

The non-maskable interrupt ($\overline{NMI}$) input requests that a non-masked-interrupt sequence be generated within the microprocessor. As with the Interrupt Request signal, the microprocessor will complete the current instruction that is being executed before it recognizes the $\overline{NMI}$ signal. The interrupt mask bit in the Condition Code Register has no effect on NMI.

The Index Register, Program Counter, Accumulators and Condition Code Register are stored away on the stack. At the end of the cycle, a 16-bit address will be loaded that points to a vectoring address which is located in memory locations n-2 and n-3. An address loaded at these locations causes the MPU to branch to a non-maskable interrupt routine in memory.

To complete the discussion of the MPU as a functional element of the system, it is useful to re-examine its characteristics from the more specific viewpoint of programming. To the programmer, the MPU consists of a series of registers available for his use and a set of instruction codes which will manipulate data within these registers in a defined manner, dependent on the sequence of instruction codes the programmer chooses.

The MPU has three sixteen bit registers and three eight-bit registers available for use by the programmer. These registers are shown in FIG. 10 and function as follows:

The program counter is a two byte (16 bits) register that points to the current program address. Its contents are incremented after execution of an instruction.

The stack pointer is a two byte register that contains the address of the next available location in an external push-down/pop-up stack. This stack is normally a random access Read/Write memory that may have any location (address) that is convenient. In those applications that require storage of information in the stack when power is lost, the stack must be non-volatile.

The index register is a two byte register that is used to store a sixteen bit memory address for the Indexed mode of memory addressing.

The MPU contains two 8-bit accumulators that are used to hold operands and results from an arithmetic logic unit (ALU).

The condition code register indicates the results of an Arithmetic Logic Unit operation: Negative (N), Zero(Z), Overflow(V), Carry from bit 8(C), Half carry from bit 3(H), and the Interrupt mask bit (I). These bits of the Condition Code Register are used as testable conditions for the conditional branch instructions. The unused bits of the Condition Code Register (B6 and B7) are ones.

The MPU has a set of 72 different instructions that have been designed for uses such as in point-of-sale terminals, data communications, and peripheral control. Included are binary and decimal arithmetic, logical, shift, rotate, load, store conditional or unconditional branch, interrupt and stack manipulation instruction. A listing of these instructions is given in Table 7.

The MPU is an eight-bit processor that has seven address modes that can be used by a programmer, with the addressing mode a function of both the type instruction and the coding within the instruction. A summary of the addressing modes for a particular instruction can be found in Table 9 along with the associated instruction execution time that is given in machine cycles. With a clock frequency of 1 MHz, these times would be microseconds.

In accumulator only (ACCK) addressing, either accumulator A or accumulator B is specified. These are one-byte instructions.

In immediate addressing, the operand is contained in the second and third byte of the instruction. No further addressing of memory is required. The MPU addresses this location when it fetches the immediate instruction for execution. These are two/three-byte instruction.

In direct addressing, the address of the operand is contained in the second byte of the instruction. Direct addressing allows the user to directly address the lowest 256 bytes in the machine, i.e., locations zero through 255. That part of the memory should be used for temporary data storage and intermediate results. In most configurations, it should be a random access memory. These are two-byte instructions.

In extended addressing, the address contained in the second byte of the instruction is used as the higher eight-bits of the address of the operand. The third byte of the instruction is used as the lower eight-bits of the address for the operand. This is an absolute address in memory. These are three-byte instructions.

In indexed addressing, the address contained in the second byte of the instruction is added to the index register's lowest eight-bits in the MPU. The carry is then added to the higher order eight-bits of the index register. This result is then used to address memory. The modified address is held in a temporary address register so there is no change to the index register. These are two-byte instructions.

In the implied addressing mode the instruction gives the address (i.e., stack pointer, index register, etc). These are one-byte instructions.

In relative addressing, the address contained in the second byte of the instruction is added to the program counters lowest eight-bits plus two. The carry or borrow is then added to the high eight-bits. This allows the user to address data within a range of −125 to +129 bytes of the present instruction. These are two-byte instructions.

PIA OPERATION

The Peripheral Interface Adapter provides a relatively universal means of interfacing peripheral equipment to the Microprocessing Unit (MPU). This device is capable of interfacing an MPU to peripherals through two 8-bit bidirectional peripheral data buses and four control lines. No external logic is required for interfacing to most peripheral devices.

The functional configuration of the PIA is programmed by the MPU during system initialization. Each of the peripheral data lines can be programmed to act as an input or output, and each of the four control/interrupt lines may be programmed for one of several control modes. This allows a high degree of flexibility in the over-all operation of the interface.

FIG. 3 shows a basic block diagram of the logical elements of the PIA which accomplish the required interface functions in accordance with the functional configuration programmed by the MPU. The definition of allowable configurations and the internal control established by the functional elements for the configurations is as follows.

There are six locations within the PIA accessible to the MPU data bus, two Peripheral Interfaces, two Data Direction Registers, and two Control Registers. Selection of these locations is controlled by the RS0 and RS1 inputs together with bit 2 in the Control Register, as shown in Table 1.

A reset pulse has the effect of loading logical zeros in all PIA registers. This will set PA0-PA7, PB0-PB7, CA2 and CB2 as inputs, and all interrupts will be disabled. The PIA must be configured during the restart program which follows the reset pulse.

Details of possible configurations of the Data Direction and Control Register are as follows.

The two Data Direction Registers DDRA and DDRB, reference numerals 4I and 19I, respectively in FIG. 6, allow the MPU to control the direction of data through each corresponding peripheral data line. A data Direction Register bit set at "0" configures the corresponding peripheral data line as an input; a "1" results in an output.

The two Control Registers CRA and CRB, reference numerals 2I and 17I, respectively, in FIG. 6, allow the MPU to control the operation of the four peripheral control lines CA1, CA2, CB1 and CB2. In addition they allow the MPU to enable the interrupt flags. Bits 0 through 5 of the two registers may be written or read by the MPU when the proper chip select and register select signals are applied. Bits 6 and 7 of the two registers are read only and are modified by external interrupts occurring on control lines CA1, CA2, CB1 or CB2. The format of the control words is shown in Table 2.

Bit 2 in each control register CRA and CRB (CRA2 and CRB2) allows selection of either a Peripheral Interface Register or the Data Direction Register when the proper register select signals are applied to RS0 and RS1.

The four interrupt flag bits CRA-6, CRA-7, CRB-6, and CRB-7 are set by active transitions of signals on the four Interrupt and Peripheral Status lines when those lines are programmed to be interrupt inputs. These bits cannot be set directly from the MPU Data Bus and are reset indirectly by a Read Peripheral Data Operation on the appropriate section.

The two lowest order bits of the control registers CRA and CRB are used to control the interrupt input lines CA1 and CB1. Bits CRA-0 and CRB-0 are used to enable the MPU interrupt signals IRQA and IRQB, respectively. Bits CRA-1 and CRB-1 determine the active transition of the interrupt input signals CA1 and CB1 (see Table 3).

Bits 3, 4 and 5 of the two control registers CRA and CRB are used to control the CA2 and CB2 Peripheral Control lines. These bits determine if the control lines will be an interrupt input or an output control signal. If bit AC-5 (BC-5) is low, CA2 (CB2) is an interrupt input line similar to CA1 (CB1) (Table 4). When AC-5 (CRB-5) is high, CA2 (CB2) becomes an output signal that may be used to control peripheral data transfers. When in the output mode, CA2 and CB2 have slightly different characteristics; see Tables 5 and 6. When in the output mode, the low state of CA2 (CB2) is established by an MPU Read or Write operation, while the high state may be determined by an active transition of CA1 (CB1), an E pulse transition, or by an MPU Write operation.

FIG. 3 also shows the various electrical signal lines required. These signal lines fall into either the PIA to MPU category or the PIA to peripheral unit category and operate as follows:

The PIA interfaces to the MPU with an eight-bit bidirectional data bus, three chip select lines, two register select lines, two interrupt request lines, read/write line, enable line and reset line. These signals permit the MPU to have complete control over the PIA.

The bidirectional data lines (D0-D7) allow the transfer of data between the MPU and the PIA. The data bus output drivers are three-state devices that remain in the high-impedance (off) state except when the MPU performs a PIA read operation. The Read/Write line is in the Read (high) state when the PIA is selected for a Read operation.

The enable pulse, E, is the only timing signal that is supplied to the PIA. Timing of all other signals is referenced to the leading and trailing edges of the E pulse. In normal operation with the MPU this input is a MPU "Valid Memory Address" signal (designated VMA) ANDed with the phase two clock (VMA.φ2).

The PIA Read/Write (R/W) signal is generated by the MPU to control the direction of data transfers on the Data bus. A low state on the PIA Read/Write line enables the input buffers and data is transferred from the MPU to the PIA on the E signal if the device has been selected. A high (i.e., a "high" logic level) on the Read/Write line sets up the PIA for a transfer of data to the bus. The PIA output buffers are enabled when the proper address and the enable pulse E are present.

The active low Reset line is used to reset all register bits in the PIA to a logical zero (low). This line can be used as a power-on reset and as a master reset during system operation.

These three input signals, CS, CS1 and CS2 are used to select the PIA. CS0 and CS1 must be high and CS2 must be low for selection of the device. Data transfers are then performed under the control of the Enable and Read/Write signals. The chip select lines must be stable for the duration of the E pulse.

The two register select lines are used to select the various registers inside the PIA. These two lines are used in conjunction with internal Control Registers to select a particular register that is to be written or read.

The Register select lines should be stable for the duration of the E pulse while in the read or write cycle.

The active low Interrupt Request lines (IRQA and IRQB) act to interrupt the MPU either directly or through interrupt priority circuitry. These lines are "open source" (no load device on the chip) and are capable of sinking a current of 1.6 mA from an external source. This permits all interrupt request lines to be tied together in a wire-OR configuration.

Each Interrupt Request Line has two internal interrupt flag bits that will cause the Interrupt Request line to go low. Each flag bit is associated with a particular peripheral interrupt line. Also four interrupt enable bits are provided in the PIA which may be used to inhibit a particular interrupt from a peripheral device. Servicing an interrupt by the MPU is accomplished by a software routine that, on a prioritized basis, sequentially reads and tests the two control registers in each PIA for interrupt flag bits that are set.

The Interrupt Flag is cleared (zeroed) as a result of an MPU Read Peripheral Data Operation.

The PIA provides two 8-bit bi-directional data buses and four interrupt/control lines for interfacing to peripheral devices.

Each of the peripheral data lines can be programmed to act as an input or output. This is accomplished by setting a "1" in the corresponding Data Direction register bit for those lines which are to be outputs. A "0" in a bit of the Data Direction Register causes the corresponding peripheral lines programmed to act as an input. In the input mode these lines represent a maximum of one standard TTL load.

The data in Output Register A, reference numeral 141' in FIG. 6, will appear on the data lines that are programmed to be outputs. A logical "1" written into the register will cause a "high" on the corresponding data line while a "0" results in a "low". Data in Peripheral Interface Register A may be read by an MPU "Read Peripheral Data A" operation when the corresponding lines are programmed as outputs. This data will be read properly if the voltage on the peripheral data lines is allowed to be greater than 2.0 volts for a logic "1" output and less than 0.8 volt for a logic "0" output. Loading the output lines such that the voltage on these lines does not reach full voltage causes the data transferred into the MPU on a Read Operation to differ from that contained in the respective bit of Output Register A.

The peripheral data lines in the B Section of the PIA can be programmed to act as either inputs or outputs in a similar manner to PA0-PA7. However, the output buffers driving these lines differ from those driving lines PA0-PA7. They have three-state capability, allowing them to enter a high impedance state when the peripheral data line is used as an input. In addition, data on the peripheral data lines PB0-PB7 will be read properly from those lines programmed as outputs even if the voltages are below 2.0 volts for a "high". As outputs, these lines are compatible with standard TTL and may also be used as a source of up to 1 milliampere at 1.5 volts to directly drive the base of a transistor switch.

Peripheral Input Lines CA1 and CB1 are input only lines that set the interrupt flags of the control registers.

The active transition for these signals is also programmed by the two control registers.

The peripheral control line CA2 can be programmed to act as an interrupt input or as a peripheral control output. As an output, this line is compatible with standard TTL; as an input it represents one standard TTL load. The function of this signal line is programmed with Control Register A.

Peripheral Control line CB2 may also be programmed to act as an interrupt input or peripheral control output. As an input, this line has greater than 1 megohm input impedance and is compatible with standard TTL. As an output it is compatible with standard TTL and may also be used as a source of up to 1 milliampere at 1.5 volts to directly drive the base of the transistor switch. This line is programmed by control Register B.

RAM OPERATION

The MPU system is readily adaptable to use with many different kinds of RAMs. One specific type, a 1024 bit static RAM, as shown in FIG. 7, is discussed herein. This memory is byte organized as 128 words of 8-bits per word and is specifically designed for use in bus-organized systems.

It is fabricated with N-channel silicon-gate technology. For ease of use, the device operates from a single power supply, has direct compatibility with TTL and DTL, and needs no clocks or refreshing because of static operation.

This memory is compatible with the MPU system, providing random storage in byte increments. Memory expansion is provided through multiple Chip Select inputs.

FIG. 7 shows a functional block diagram of the 128 word × 8-bit RAM. Referring to these figures, the operation of the memory is as follows:

Chip selection is accomplished by applying a low state to the four negative enable inputs $\overline{CS1}$, $\overline{CS2}$, $\overline{CS4}$, $\overline{CS5}$, and a high state to the two positive enable inputs CS0 and CS3. The memory is inhibited by inverting the state of any enable input from the above conditions. The chip select circuitry interfaces directly with the three-state output buffers; therefore, inhibiting the memory forces the open circuit condition for the three-state buffers.

Each of the 128 eight-bit words is addressed by applying the proper binary code to the seven address inputs.

Because the RAM has a bidirectional output bus, when a write cycle is to be performed, the R/W line must be placed in the write mode (low state) before the chip is selected. If this is not done, then the RAM will try to drive the I/O bus at the same time an external device is driving this same bus.

Therefore, writing is accomplished by applying a low state of the R/W control line before the chip is selected. Under this condition, the data on the input/output lines is stored in the location designated by the address inputs.

Reading is accomplished by applying a high state to the read/write control line when the chip is enabled. This causes the date stored in the location designated by the address inputs to be placed on the input/output lines.

Most MPU system applications require some amount of permanent data storage to provide a program nucleus for start-up, re-initialization after power failure, etc. and this data storage is usually provided with ROM's. As with RAM's, the MPU system of this application is adaptable to a variety of ROM types. This discussion is directed to a 8192 bit mask-programmable, byte organized memory specifically designed for use in bus organized systems. This memory is organized as 1024 words of 8-bits and is fabricated with N-channel silicon-gate technology. For ease of use, the device operates from a single power supply, has direct compatibility with TTL and DTL, and needs no clock or refreshing because of static operation.

The memory is compatible with the MPU system, providing read only storage in byte increments. Memory expansion is provided through multiple Chip Select inputs. The active level of the Chip Select inputs and the memory content are defined by the customer.

ROM OPERATION

FIG. 8 shows a functional block diagram of the ROM. The electrical operation of the ROM is straightforward.

ACIA OPERATION

The ACIA is a monolithic integrated circuit specifically designed to provide data formatting and control for serial asynchronous (start-stop) data communications for the MPU system.

Four distinct functions are performed by the ACIA, including MPU Interfacing which is performed by select, enable, read/write, interrupt and bus interface logic for compatibility with the Microprocessing Unit.

A second function is Asynchronous Data Transmission, which includes parallel-to-serial conversion of data, insertion of start and stop bits, parity bit insertion, and serial transmission of data words having commonly used numbers of bits.

A third function is Asynchronous Data Reception, which includes serial asynchronous reception of standard length data words, start and stop bit deletion, parity and error checking, and serial-to-parallel conversion of data.

A fourth function is Modem Control, which includes limited modem control functions Clear-to-Send, Request-to-Send, and Data Carrier Detect.

The ACIA signal interconnections fall into the catagories of interconnections for communication to the MPU and interconnections for communication to and control of the associated peripheral device. FIG. 9A shows these interconnections which are defined and operate as follows.

The ACIA interfaces to the MPU with an eight-bit bidirectional data bus, three chip select lines, a register select line, a read/write line, an enable line, and an interrupt request line.

The bidirectional data lines (D0–D7) conduct data transferred between the ACIA and the MPU. The data bus output drivers are three-state devices that remain in the high-impedance (off) state except when the MPU performs an ACIA read operation.

The enable signal, E, is a high impedance TTL compatible input that enables the input/output data buffers and clocks data to and from the ACIA. In normal operation with the MPU, this signal will be VMA.$\phi$2 (the logical AND of VMA and $\phi$2). VMA is the Valid Memory Address and $\phi$2 is the phase two clock signal for the MPU.

The Read/Write line is a high impedance input that is TTL compatible and is used to control the direction of data flow through the ACIA's input/output data bus interface. When Read/Write is high (for an MPU Read cycle), an ACIA output driver is turned on and a selected register is read. When it is low, the ACIA output driver is turned off and the MPU writes into a selected register. Thus, the Read/Write signal is used to select the registers within the ACIA that are Read Only or Write Only.

The three high impedance TTL compatible input lines CS0, CS1, $\overline{CS2}$ are used to address an ACIA. A particular ACIA chip is selected when CS0 and CS1 are high and CS2 is low. Transfers of data to an ACIA are then performed under the control of the Enable signal and Read/Write.

The Register Select line is a high impedance input that is TTL compatible and is used to select the Transmit/Receive Data or Control/Status registers in the ACIA. The Read/Write signal line is used in conjunction with Register Select to select the Read Only or Write Only register in each register pair.

Interrupt request $\overline{IRQ}$ is a TTL compatible, open drain active low output that is used to interrupt the MPU. The Interrupt Request remains low as long as the cause of the interrupt is present and the appropriate interrupt enable within the ACIA is set.

Separate high impedance TTL compatible inputs are provided for clocking of transmitted and received data. Clock frequencies of 1, 16 or 64 times the data rate may be selected.

The Transmit Clock input CTX is used for the clocking of transmitted data. The transmitter initiates data on the negative transition of the clock.

The Receive Clock input RTX is used for synchronization of received data. (In the ÷1 mode, the clock and data must be synchronized externally.) The receiver strobes the data on the positive transition of the clock.

The Received Data line RXD is a high impedance TTL compatible input through which data is received in a serial NRZ (Non Return to Zero) format. Synchronization with a clock for detection of data is accomplished internally when clock rates of 16 or 64 times the bit rate are used. Data rates are in the range of 0 to 500 Kbps when external synchronization is utilized.

The Transmit Data output line TXD transfers serial NRZ (no return to zero) data to a modem or other peripheral at the same range of rates as the received data.

The ACIA includes several functions that permit limited control of a data modem. The functions included are Clear-to-Send, Request-to-Send and Data Carrier Detect.

The high impedance TTL compatible input clear-to-send (CTS) provides automatic control of the transmitting end of a communications link via the modem's "clear-to-send" active low output.

The Request-to-Send output $\overline{RTS}$ enables the MPU to control a modem via the data bus. The active state is low.

The high impedance TTL compatible input data carrier detected DCD provides automatic control of the receiving end of a communications link by means of the modem "Data-Carrier-Detect" or "Received-Line-Signal Detect" output. The $\overline{DCD}$ input inhibits and initializes the receiver section of the ACIA when high. A low to high transition of the Data Carrier Detect initiates an interrupt to the MPU to indicate the occurrence of a loss of carrier.

The ACIA makes use of internal registers on the chip for the status, control, receiving and transmitting of data. FIG. 9B shows these registers in a functional block diagram of the ACIA. The ACIA control Register 4N consists of eight bits of write only buffer that are selected when RS and R/W are low. This register controls the function of the receiver, transmitter, interrupt enables, and the Request-to-Send modem control output.

The Counter divide Select bits (CRA and CR1) determine the divide ratios utilized in both the transmitter and receiver sections of the ACIA Additionally, these bits are used to provide a Master Reset for the ACIA which clears the Status Register IN and initializes both the receiver and transmitter. Note that when the system is initialized, these bits must be set High to reset the ACIA. After resetting the clock divide ratio may be selected. These counter select bits provide for the following clock divide ratios:

| CR1 | CR0 | Function |
|-----|-----|----------|
| 0   | 0   | 1        |
| 0   | 1   | 16       |
| 1   | 0   | 64       |
| 1   | 1   | Master Reset |

The Word Select bits CR2, CR3, and CR4 are used to select word length, parity, and the number of stop bits. The encoding format is as follows:

| CR4 | CR3 | CR2 | FUNCTION |
|-----|-----|-----|----------|
| 0 | 0 | 0 | 7 Bits + Even Parity + 2 Stop Bits |
| 0 | 0 | 1 | 7 Bits + Odd Parity + 2 Stop Bits |
| 0 | 1 | 0 | 7 Bits + Even Parity + 1 Stop Bit |
| 0 | 1 | 1 | 7 Bits + Odd Parity + 1 Stop Bit |
| 1 | 0 | 0 | 8 Bits + 2 Stop Bits |
| 1 | 0 | 1 | 8 Bits + 1 Stop Bit |
| 1 | 1 | 0 | 8 Bits + Even Parity + 1 Stop Bit |
| 1 | 1 | 1 | 8 Bits + Odd Parity + 1 Stop Bit |

Parity selection changes (Odd to Even or Even to Odd) immediately affect the receiver operating state but are delayed until after the next transmitter transfer signal before becoming effective for the transmitter. Word length, Parity Select, and Stop Bit changes are not double-buffered and therefore become effective immediately.

Transmitter Control Bits (CR5 and CR6)—Two Transmitter Control bits provide for the control of the Transmitter Buffer Empty interrupt output, the Request-to-Send output and the transmission of a BREAK level (space). The following encoding format is used:

| CR6 | CR5 | FUNCTION |
|-----|-----|----------|
| 0 | 0 | RTS-low, Transmitting Interrupt Disabled($\overline{TIE}$) |
| 0 | 1 | RTS-low, Transmitting Interrupt Enabled($\overline{TIE}$) |
| 1 | 0 | RTS-high, Transmitting Interrupt Disabled($\overline{TIE}$) |
| 1 | 1 | RTS-low, Transmitting Interrupt Disabled($\overline{TIE}$) and Transmits a BREAK level on the Transmit Data Output. |

Receiver Interrupt Enable Bit (CR7)—Interrupts will be enabled by a high level in bit position 7 of the Control Register (CR7). Interrupts will be caused by the Receiver Data Register Full going high or by a low to high transistion on the Data Carrier Detect signal line. The interrupt will be cleared by selecting the Receiver Data Register or disabled by resetting the Receiver Interrupt Enable Bit.

Data is written in the Transmit Data Register 2N during the peripheral enable time (E0) when the ACIA has been addressed and RS.R/W is selected. Writing data into the register causes the Transmit Data register Empty bit in the status register to go low. Data can then be transmitted. If the transmitter is idling and no character is being transmitted, then the transfer will take place within one bit time of the trailing edge of the Write command. If a character is being transmitted, the new data character will commence as soon as the previous character is complete. The transfer of data causes the Transmit Data Register Empty (TDRE) bit to indicate empty.

Data is automatically transferred to the empty Receive Data Register (RDR), reference numberal 5N, from the receiver deserializer (a shift register) upon receiving a complete character. This event causes the Receiver Data Register Full bit (RDRF) (in the status buffer) to go high (full). Data may then be read through the bus by addressing the ACIA and selecting the Receiver Data Register with RS and R/W high when the ACIA is enabled. The non-destructive read cycle causes the RDRF bit to be cleared to empty although the data is retained in the RDR. The status is maintained by RDRF as to whether or not the data is current. When the Receiver Data Register is full, the automatic transfer of data from the Receiver Shift Register to the Data Register is inhibited and the RDR contents remain valid with its current status stored in the Status Register.

The MPU system and its functional building blocks have now been discussed. A broad range of functioning digital control systems which capitalize on the MPU systems special capabilities may be implemented therewith. In describing complete systems of this type, it is useful to recite a specific example of a system configuration which summarizes and integrates the information thus far presented.

To demonstrate the versatility of the functional building block concept, a typical system configuration will be discussed. This configuration will demonstrate how easily a basic system may be upgraded and expanded for an unlimited number of different applications.

The Microprocessor Unit (MPU) may be configured with a Read Only Memory (ROM), Random Access Memory (RAM), a peripheral Interface Adapter (PIA), restart circuitry and clock circuitry to form a minimum functional system, as shown in FIG. 11. Such a system can easily be adapted for a number of small scale applications by simply changing the contents of the ROM.

The MPU requires a two-phase non-overlapping clock which as a frequency range as high as 1 MHz. In addition to the two phases, this circuit should also generate an enable Signal E, and its complement $\overline{E}$, to enable ROMs, RAMs, PIAs and ACIAs. This Enable signal and its complement are obtained by ANDing $\phi 2$ and VMA (Valid Memory Address).

The minimum system configuration permits direct selection of the ROM, RAM, ACIA and PIA without the use of special TTL selection logic. This is accomplished by simply wiring the address lines A13 and A14 to the Enable or chip select lines on the memories and PIA. This permits the devices to be addressed as follows:

| DEVICE | A14 | A13 | HEX ADDRESSES |
|--------|-----|-----|---------------|
| RAM | 0 | 0 | 0000-007F |
| PIA | 0 | 1 | 2004-2007 (Registers) |
| ROM | 1 | 1 | 6000-63FF |

Other addressing schemes can be utilized which use any combination of two of the lines A10 through A14 for chip selection.

All control and timing for the peripherals that are connected to the PIA is accomplished by software routines under the control of the MPU.

Since this basic system does not have a nonvolatile RAM, special circuitry to handle loss of power using NMI is not required. Circuitry is, however, required to insure proper initialization of the MPU when power is turned on. This circuit should insure that the Restart signal is held low for eight $\phi 1$ clock cycles after the $V_{DD}$ power supply reaches a voltage of approximately 4.75 volts DC. Also, in order to insure that a PIA or ACIA is not inadvertently selected during the power-on sequence, Three-State Control (TSC) should be held high until the positive transition of Restart.

The Go/Halt line is tied to $V_{CC}$ and will automatically place the MPU in the GO state when power is turned on. This signal may be used to halt the MPU if a switch is used to tie the line to ground for HALT and to $V_{CC}$ for RUN.

The minimum system may be easily expanded without the addition of TTL integrated circuits. One possible expanded configuration which has 512 bytes of RAM, 4096 bytes of ROM and three PIAs is shown in FIG. 12. Table 8 provides information on the device select addresses that are used by this expanded system. This method places the RAMs at the low order addresses and the ROMs at the higher order addresses. Addresses for the PIAs (or ACIAs) are located between the RAMs and ROMs and are not contiguous because of the 1 of 4 line method of selection. This method of selection could be expanded to eleven lines since A6 through A12 are not used.

Two-Phase Clock Circuitry and Restart circuitry for this expanded system are the same as for the basic system.

Logic has been added to the basic system to handle Go/Halt and single instruction execution or stepping. Single instruction execution is accomplished by allowing the Go/Halt line to go high during one clock time when a momentary contact console switch is pressed.

The Interrupt lines for the three PIAs are wired together to form a common Interrupt Request (IRQ) for the MPU. A software interrupt polling scheme is used to determine which PIA caused the interrupt.

Typical system timing sequences are shown in FIGS. 13A-13D.

While the invention has been described with reference to presently preferred embodiments thereof, those skilled in the art will recognize that variations in arrangement and placement of parts may be made to suit varying requirements within the scope of the invention.

TABLE 1

INTERNAL ADDRESSING

| RS1 | RS0 | Control Register Bit AC-2 | BC-2 | Location Selected |
|---|---|---|---|---|
| 0 | 0 | 1 | X | Peripheral Interface A |
| 0 | 0 | 0 | X | I/O Control Register A |
| 0 | 1 | X | X | Control Register A |
| 1 | 0 | X | 1 | Peripheral Interface B |
| 1 | 0 | X | 0 | I/O Control Register B |
| 1 | 1 | X | X | Control Register B |

TABLE 2

CONTROL WORD FORMAT

| | 7 | 6 | 5 | 4 | 3 | 2 | 1 | 0 |
|---|---|---|---|---|---|---|---|---|
| AC | IRQA1 | IRQA2 | CA2 Control | | DDRA Access | | CA1 Control | |

| | 7 | 6 | 5 | 4 | 3 | 2 | 1 | 0 |
|---|---|---|---|---|---|---|---|---|
| BC | IRQB1 | IRQB2 | CB2 Control | | DDRB Access | | CB1 Control | |

TABLE 3

CONTROL OF INTERRUPT INPUTS CA1 AND CB1

| AC-1 (BC-1) | AC-0 (BC-0) | Interrupt Input CA1 (CB1) | Interrupt Flag AC-7 (BC-7) | MPU Interrupt Request IRQA (IRQB) |
|---|---|---|---|---|
| 0 | 0 | ↓ Active | Set high on ↓ of CA1 (CB1) | Masked-IRQ remains high |
| 0 | 1 | ↓ Active | Set high on ↓ of CA1 (CB1) | Goes low when the interrupt flag bit AC-7 (BC-7) goes high |
| 1 | 0 | ↑ Active | Set high on ↑ of CA1 (CB1) | Masked-IRQ remains high |
| 1 | 1 | ↑ Active | Set high on ↑ of CA1 (CB1) | Goes low when the interrupt flag bit AC-7 (BC-7) goes high |

TABLE 3-continued

CONTROL OF INTERRUPT INPUTS CA1 AND CB1

| AC-1 (BC-1) | AC-0 (BC-0) | Interrupt Input CA1 (CB1) | Interrupt Flag AC-7 (BC-7) | MPU Interrupt Request IRQA (IRQB) |
|---|---|---|---|---|

Notes:
1. ↑ Indicates positive transition (low to high)
2. ↓ Indicates negative transition (high to low)
3. The Interrupt flag bit AC-7 is cleared by an MPU Read of the A Data Register and BC-7 is cleared by an MPU Read of the B Data Register
4. If AC-0 (BC-0) is low when an interrupt occurs (Interrupt masked) and is later brought high, IRQA (IRQB) occurs on the positive transition of CAC-0 (CBC-0).

TABLE 4

CONTROL OF CA2 AND CB2 AS INTERRUPT INPUTS
AC-5 (BC-5) is low

| AC-5 (BC-5) | AC-4 (BC-4) | AC-3 (BC-3) | Interrupt Input CA2 (CB2) | Interrupt Flag AC-6 (CRB-6) | MPU Interrupt Request IRQA (IRQB) |
|---|---|---|---|---|---|
| 0 | 0 | 0 | ↓ Active | Set high on ↓ of CA2 (CB2) | Masked-IRQ remains high |
| 0 | 0 | 1 | ↓ Active | Set high on ↓ of CA2 (CB2) | Goes low when the interrupt flag bit AC-6 (BC-6) goes high |
| 0 | 1 | 0 | ↑ Active | Set high on ↑ of CA2 (CB2) | Masked-IRQ remains high |
| 0 | 1 | 1 | ↑ Active | Set high on ↑ of CA2 (CB2) | Goes low when the interrupt flag bit AC-6 (BC-6) goes high |

Notes:
1. ↑ Indicates positive transition (low to high)
2. ↓ Indicates negative transition (high to low)
3. The interrupt flag bit AC-6 is cleared by an MPU Read of the A Data Register and BC-6 is cleared by an MPU Read of the B Data Register
4. If AC-3 (BC-3) is low when an interrupt occurs (interrupt masked) and is later brought high, IRQA (IRQB) occurs on the positive transition of AC-3 (BC-3).

TABLE 5

CONTROL OF CB2 AS OUTPUT
BC-5 is high

| BC-5 | BC-4 | BC-3 | CB2 Cleared | CB2 Set |
|---|---|---|---|---|
| 1 | 0 | 0 | Low on the positive transition of the first E pulse following an MPU Write "B" Data Register operation | High when the interrupt BC-7 is set by an active transition of the CB1 signal |
| 1 | 0 | 1 | Low on the positive transition of the first E pulse following an MPU Write "B" Data Register operation. | High on the positive transition of the next "E" pulse |
| 1 | 1 | 0 | Low when BC-3 goes low as a result of an MPU Write in Control Register "B". | Always low as long as BC-3 is low. Will go high on an MPU Write in Control Register "B" that changes to "one" |
| 1 | 1 | 1 | Always high as long as BC-3 is high. Will be cleared when an MPU Write Control Register "B" results in clearing BC-3 to "zero" | High when BC-3 goes high as a result of an MPU Write into control register "B" |

TABLE 6

CONTROL OF CA2 AS AN OUTPUT
AC-5 is high

| AC-5 | AC-4 | AC-3 | CA2 Cleared | CA2 Set |
|---|---|---|---|---|
| 1 | 0 | 0 | Low on negative transition of E after an MPU Road "A" Data operation. | High on an active transition of the CA1 signal. |
| 1 | 0 | 1 | Low immediately after an MPU Read "A" Data operation. | High on the negative edge of the next "E" pulse. |
| 1 | 1 | 0 | Low when AC-3 goes low as a result of an MPU Write in Control Register "A". | Always low as long as AC-3 is low. |
| 1 | 1 | 1 | Always high as long as AC-3 is high. | High when AC-3 goes high as a result of a Write in Control Register "A". |

TABLE 7

MICROPROCESSOR INSTRUCTIONS SET ALPHABETIC SEQUENCE

| | | | | | |
|---|---|---|---|---|---|
| ABA | Add Accumulators | CMP | Compare | ROL | Rotate Left |
| ADC | Add with Carry | COMP | Complement | ROR | Rotate Right |
| ADD | Add | CPX | Compare Index Register | RTI | Return from Interrupt |
| AND | Logical And | | | RTS | Return from Subroutine |
| ASL | Arithmetic Shift Right | DAA | Decimal Adjust | | |
| | | DEC | Decrement | SBA | Subtract Accumulators |
| BCC | Branch if Carry Clear | DES | Decrement Stack Pointer | SBC | Subtract with Carry |
| BCS | Branch if Carry Set | DEX | Decrement Index Register | SEC | Set Carry |
| BEQ | Branch if Equal to Zero | | | SEI | Set Interrupt Mask |
| BGE | Branch if Greater or Equal Zero | EOR | Exclusive OR | SEV | Set Overflow |
| | | | | STA | Store Accumulator |
| BGT | Branch if Greater than Zero | INC | Increment | STS | Store Stack Register |
| | | INS | Increment Stack Pointer | STX | Store Index Register |
| BHI | Branch if Higher | INX | Increment Index Register | SUB | Subtract |
| BIT | Bit Text | | | SWI | Software Interrupt |
| BLE | Branch if Less or Equal | JMP | Jump | | |
| BLS | Branch if Lower or Same | JSR | Jump to Subroutine | TAB | Transfer Accumulators |
| BLT | Branch if Less than Zero | | | TAP | Transfer Accumulators to Condition Code Reg. |
| BMI | Branch if Minus | LDA | Load Accumulator | | |
| BNE | Branch if Not Equal to Zero | LDS | Load Stack Pointer | TBA | Transfer Accumulators |
| BPL | Branch if Plus | LDX | Load Index Register | TPA | Transfer Condition Code Reg. to Accumulator |
| BRA | Branch Always | LSR | Logical Shift Right | | |
| BSR | Branch to Subroutine | | | TST | Test |
| BVC | Branch if Overflow Clear | NEG | Negate | TSX | Transfer Stack Pointer to Index Register |
| | | NOP | No Operation | | |
| CBA | Compare Accumulators | | | TXS | Transfer Index Register to Stack Pointer |
| CLC | Clear Carry | ORA | Inclusive OR Accumulator | | |
| CLR | Clear | | | | |
| CLV | Clear Overflow | PSH | Push Data | WAI | Wait for Interrupt |
| | | PUL | Pull Data | | |

TABLE 8

DEVICE SELECTION ADDRESSING

| DEVICE | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| RAM 1 | d | 0 | 0 | d | d | d | d | 0 | 0 | X | X | X | X | X | X | X |
| RAM 2 | d | 0 | 0 | d | d | d | d | 0 | 1 | X | X | X | X | X | X | X |
| RAM 3 | d | 0 | 0 | d | d | d | d | 1 | 0 | X | X | X | X | X | X | X |
| RAM 4 | d | 0 | 0 | d | d | d | d | 1 | 1 | X | X | X | X | X | X | X |
| ROM 1 | d | 1 | d | d | 0 | 0 | X | X | X | X | X | X | X | X | X | X |
| ROM 2 | d | 1 | d | d | 0 | 1 | X | X | X | X | X | X | X | X | X | X |
| ROM 3 | d | 1 | d | d | 1 | 0 | X | X | X | X | X | X | X | X | X | X |
| ROM 4 | d | 1 | d | d | 1 | 1 | X | X | X | X | X | X | X | X | X | X |
| PIA 1 | d | 0 | 1 | d | d | d | d | d | d | d | 0 | 0 | 1 | X | X | |
| PIA 2 | d | 0 | 1 | d | d | d | d | d | d | d | 0 | 1 | 0 | X | X | |
| PIA 3 | d | 0 | 1 | d | d | d | d | d | d | d | 1 | 0 | 0 | X | X | | d = don't care
x = variable address
0 = Logical zero
1 = Logical one

TABLE 9

INSTRUCTION ADDRESSING MODES AND ASSOCIATED EXECUTION TIMES (TIMES IN MACHINE CYCLES)

| | (Dual Operand) | ACCX | Immediate | Direct | Extended | Indexed | Implied | Relative | | (Dual Operand) | ACCX | Immediate | Direct | Extended | Indexed | Implied |
|---|---|---|---|---|---|---|---|---|---|---|---|---|---|---|---|---|
| ABA | | | | | | | 2 | | INC | | 2 | | | 6 | 7 | |
| ADC | x | | 2 | 3 | 4 | 5 | | | INS | | | | | | | 4 |
| ADD | x | | 2 | 3 | 4 | 5 | | | INX | | | | | | | 4 |
| AND | x | | 2 | 3 | 4 | 5 | | | JMP | | | | | 3 | 4 | |
| ASL | | 2 | | | 6 | 7 | | | JSR | | | | | 9 | 8 | |
| ASR | | 2 | | | 6 | 7 | | | LDA | x | | 2 | 3 | 4 | 5 | |
| BCC | | | | | | | | 4 | LDS | | | 3 | 4 | 5 | 6 | |
| BCS | | | | | | | | 4 | LDX | | | 3 | 4 | 5 | 6 | |
| BEA | | | | | | | | 4 | LSR | | 2 | | | 6 | 7 | |
| BGE | | | | | | | | 4 | NEG | | 2 | | | 6 | 7 | |
| BGT | | | | | | | | 4 | NOP | | | | | | | 2 |
| BHI | | | | | | | | 4 | ORA | x | | 2 | 3 | 4 | 5 | |
| BIT | x | | 2 | 3 | 4 | 5 | | | PSH | | | | | | | 4 |
| BLE | | | | | | | | 4 | PUL | | | | | | | 4 |
| BLS | | | | | | | | 4 | ROL | | 2 | | | 6 | 7 | |
| BLT | | | | | | | | 4 | ROR | | 2 | | | 6 | 7 | |
| BMI | | | | | | | | 4 | RTI | | | | | | | 10 |
| BNE | | | | | | | | 4 | RTS | | | | | | | 5 |
| BPL | | | | | | | | 4 | SBA | | | | | | | 2 |
| BRA | | | | | | | | 4 | SBC | x | | 2 | 3 | 4 | 5 | |
| BSR | | | | | | | | 8 | SEB | | | | | | | 2 |
| BVC | | | | | | | | 4 | SEI | | | | | | | 2 |
| BVS | | | | | | | | 4 | SEV | | | | | | | 2 |
| CBA | | | | | | | 2 | | STA | x | | | 4 | 5 | 6 | |
| CLC | | | | | | .2 | 2 | | STS | | | | 5 | 6 | 7 | |
| CLI | | | | | | | 2 | | STX | | | | 5 | 6 | 7 | |
| CLR | | 2 | | | 6 | 7 | | | SUB | x | | 2 | 3 | 4 | 5 | |
| CLV | | | | | | | 2 | | SWI | | | | | | | 12 |
| CMP | x | | 2 | 3 | 4 | 5 | | | TAB | | | | | | | 2 |
| COM | | 2 | | | 6 | 7 | | | TAP | | | | | | | 2 |
| CPX | | | 3 | 4 | 5 | 6 | | | TBA | | | | | | | 2 |
| DAA | | | | | | | 2 | | TPA | | | | | | | 2 |
| DEC | | 2 | | | 6 | 7 | | | TST | | 2 | | | 6 | 7 | |
| DES | | | | | | | 4 | | TSX | | | | | | | 4 |
| DEX | | | | | | | 4 | | TSX | | | | | | | 4 |
| EOR | x | | 2 | 3 | 4 | 5 | | | WAI | | | | | | | 9 |

What is claimed is:

1. A digital data processing system comprising:
processor means for executing a plurality of instructions, said processor means generating control information in response to execution of a first one of said instructions, generating a write signal in response to execution of a second one of said instructions, and generating a read signal in response to execution of a third one of said instructions;

a bidirectional data bus coupled to said processor means;

memory means coupled to said processor means via said bidirectional data bus for storing said instructions and for storing data;

a peripheral data bus for coupling a peripheral device controlled by said digital data processing system to said digital data processing system; and adaptor means coupled between said peripheral data bus and said bidirectional data bus for effecting transmittal of information between said peripheral device and said digital data processing system, said adaptor means comprising:

(1) control register means for storing said control information in response to said write signal and for sending a representation of said stored control information to said processor means in response to said read signal; and (2) interface means coupled to said peripheral data bus and responsive to said control information stored in said control register means for sending data to and receiving data from said peripheral device.

2. The digital data processing system as recited in claim 1 further including a read/write conductor coupled to said processor means, said memory means, and said adaptor means, wherein said control information is stored in said control register means in response to said write signal produced on said read/write conductor by said processor means, and wherein said representation of said stored control information is sent to said processor means in response to said read signal produced on said read/write conductor by said processing means.

3. The digital data processing system as recited in claim 1 wherein said adaptor means further includes:

a plurality of control inputs coupled to said processor means;

selection means coupled to said plurality of control inputs for producing a plurality of selection signals in said adaptor means each corresponding to a unique configuration of said control inputs; and second means coupled to said selection means for coupling said interface means to said bidirectional bus.

4. The digital data processing system as recited in claim 1 further including:

an interrupt input for receiving an interrupt input signal from said peripheral device representative of an interrupt request;

an interrupt output coupled to said interface adapter for conducting an interrupt output signal produced by said adapter means; and third means coupled to said interrupt input and to said control register means for storing information representative of said interrupt request in said control register means;

said control register means also sending said information representative of said interrupt request to said processor means in response to said read signal.

5. The digital data processing system as recited in claim 4 further including:

fourth means responsive to said interrupt input signal and coupled to said control register means, said fourth means producing said interrupt output signal at said interrupt output in response to a first informational content of said control register means, and said fourth means inhibiting the production of said interrupt output signal in response to a second informational content of said control register means.

6. The digital data processing system as recited in claim 1 further including first means coupled between said interface means and said bidirectional data bus for controlling the direction of transfer of said data to and from said peripheral data bus.

* * * * *

REEXAMINATION CERTIFICATE (2432nd)
United States Patent [19]

Bennett et al.

[11] B1 4,263,650

[45] Certificate Issued Nov. 29, 1994

[54] DIGITAL DATA PROCESSING SYSTEM WITH INTERFACE ADAPTOR HAVING PROGRAMMABLE MONITORABLE CONTROL REGISTER THEREIN

[75] Inventors: Thomas H. Bennett; Earl F. Carlow, both of Scottsdale; Edward C. Hepworth, Apache Junction, all of Ariz.; Wilbur L. Mathys, Norristown, Pa.; William D. Mensch, Jr., Norristown, Pa.; Rodney H. Orgill, Norristown, Pa.; Charles I. Peddle, Norristown, Pa.; Michael F. Wiles, Phoenix, Ariz.

[73] Assignee: Motorola, Inc., Chicago, Ill.

Reexamination Request:
No. 90/002,364, Jun. 17, 1991

Reexamination Certificate for:
Patent No.: 4,263,650
Issued: Apr. 21, 1981
Appl. No.: 7,752
Filed: Jan. 30, 1979

[51] Int. Cl.⁵ .................... G06F 9/00; G06F 13/10
[52] U.S. Cl. ........................... 395/275; 395/325; 364/221; 364/232.8; 364/238.3; 364/239; 364/239.4; 364/239.7; 364/240.1; 364/241.2; 364/241.3; 364/259; 364/259.7; 364/263.2; 364/264; 364/264.1; 364/DIG. 1
[58] Field of Search ................. 395/275, 325, 800

[56] References Cited

U.S. PATENT DOCUMENTS

| Patent No. | Date | Inventor | Class |
|---|---|---|---|
| 3,462,742 | 8/1969 | Miller et al. | 340/172.5 |
| 3,579,201 | 5/1971 | Langley | 340/172.5 |
| 3,648,252 | 3/1972 | Thron et al. | 340/172.5 |
| 3,668,650 | 6/1972 | Wang | 340/172.5 |
| 3,702,462 | 11/1972 | England | 340/172.5 |
| 3,702,988 | 11/1972 | Haney et al. | 340/172.5 |
| 3,710,324 | 1/1973 | Cohen et al. | 340/172.5 |
| 3,737,861 | 6/1973 | O'Neill et al. | 395/275 |
| 3,745,532 | 7/1973 | Erwin | 340/172.5 |
| 3,748,649 | 7/1973 | McEowen et al. | 340/172.5 |
| 3,757,306 | 9/1973 | Boone | 340/172.5 |
| 3,757,308 | 9/1973 | Fosdick | 340/172.5 |
| 3,758,761 | 9/1973 | Henrion | 235/153 AK |
| 3,771,135 | 11/1973 | Huettner et al. | 340/172.5 |
| 3,798,606 | 3/1974 | Henle et al. | 340/172.5 |
| 3,800,129 | 3/1974 | Umstattd | 235/156 |
| 3,812,471 | 5/1974 | Finnin | 340/172.5 |
| 3,815,099 | 6/1974 | Cohen et al. | 340/172.5 |
| 3,821,715 | 6/1974 | Hoff et al. | 340/172.5 |
| 3,828,325 | 8/1974 | Stafford et al. | 340/172.5 |
| 3,833,930 | 9/1974 | Macker | 395/275 |
| 3,833,930 | 9/1974 | Macker | 340/172.5 |
| 3,863,228 | 1/1975 | Taylor | 340/172.5 |
| 3,864,555 | 2/1975 | Brinker et al. | 235/150.2 |
| 3,866,184 | 2/1975 | Buhrke et al. | 340/172.5 |
| 3,871,579 | 3/1975 | Inamura | 235/198 |
| 3,873,819 | 3/1975 | Greenwald | 235/153 AK |
| 3,876,979 | 4/1975 | Winn et al. | 340/146.1 |
| 3,879,712 | 4/1975 | Edge et al. | 340/172.5 |
| 3,881,174 | 4/1975 | Barnich | 340/172.5 |
| 3,882,455 | 5/1975 | Heck et al. | 340/146.1 BE |
| 3,886,524 | 5/1975 | Appelt | 340/172.5 |
| 3,889,236 | 6/1975 | Herger et al. | 340/172.5 |
| 3,891,974 | 6/1975 | Coulter et al. | 340/172.5 |
| 3,902,162 | 8/1975 | Parkinson et al. | 340/172.5 |
| 3,905,024 | 9/1975 | Boucek et al. | 340/172.5 |
| 3,905,025 | 9/1975 | Davis et al. | 340/172.5 |
| 3,906,163 | 9/1975 | Brenski et al. | 179/18 ES |
| 3,909,790 | 9/1975 | Shapiro et al. | 340/172.5 |
| 3,909,795 | 9/1975 | Chang et al. | 340/172.5 |
| 3,909,799 | 9/1975 | Recks et al. | 340/172.5 |
| 3,911,818 | 11/1975 | MacIlvaine | 101/426 |
| 3,914,741 | 10/1975 | Bonser et al. | 340/146.1 |
| 3,916,177 | 10/1975 | Greenwald | 235/153 AK |
| 3,916,178 | 10/1975 | Greenwald | 235/153 AK |
| 3,920,977 | 11/1975 | Karsas | 235/153 AE |
| 3,921,141 | 11/1975 | Wilber et al. | 340/172.5 |
| 3,934,232 | 1/1976 | Curley et al. | 340/172.5 |
| 3,938,098 | 2/1976 | Garlic | 340/172.5 |
| 3,940,743 | 2/1976 | Fitzgerald | 340/172.5 |
| 3,953,835 | 4/1976 | Cuccio et al. | 340/172.5 |
| 3,955,180 | 5/1976 | Hirtle | 340/172.5 |
| 3,978,452 | 8/1976 | Barton et al. | 340/172.5 |
| 3,978,455 | 8/1976 | Valassis et al. | 340/172.5 |
| 3,984,813 | 10/1976 | Chung | 340/172.5 |
| 3,993,934 | 11/1976 | Baker et al. | 317/101 A |
| 3,996,564 | 12/1976 | Kerrigan et al. | 340/172.5 |
| 4,004,460 | 12/1976 | Kadakia et al. | 324/73 R |
| 4,027,290 | 5/1977 | Subrizi et al. | 340/172.5 |

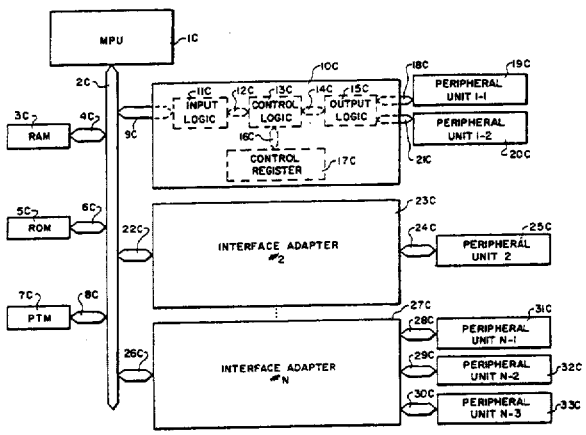

| | | | |
|---|---|---|---|
| 4,031,517 | 6/1977 | Hirtle | 364/200 |
| 4,068,299 | 1/1978 | Bachman | 364/200 |
| 4,068,300 | 1/1978 | Bachman | 364/200 |
| 4,069,510 | 1/1978 | Carlow | 364/200 |
| 4,087,852 | 5/1978 | Campbell et al. | 364/200 |
| 4,156,918 | 5/1979 | Olander et al. | 364/706 |
| 4,218,740 | 8/1980 | Bennett et al. | 364/200 |
| 4,318,182 | 3/1982 | Bachman et al. | 364/200 |
| 4,320,451 | 3/1982 | Bachman et al. | 364/200 |

OTHER PUBLICATIONS

L. Altman, *Electronics*, Apr. 18, 1974, "Single-Chip Microprocessors Open Up a New World of Applications," pp. 81–100.

W. E. Wickes, *Computer Design*, Jul. 1973, "A Compatible MOS/LSI Microprocessor Device Family," pp.75–81.

"Intel MSC-4 Micro Computer Set," Jan. 1972.

"N-Channel MOS Technology Yields New Generation of Microprocessors," L. Young et al. *Electronics*, vol. 47, Apr. 18, 1974, pp. 88–95.

"PDP-11 Peripherals and Interfacing Handbook," copyright 1971.

"PDP-11 Engineering TC11 DECtape System Engineering Drawings," copyright 1971.

"PDP-11 Handbook," copyright 1970.

"PDP-11 Convention Manual," copyright 1970, 1971, 1972.

"Programmed Data Processor-1 Handbook," copyright 1960–1963.

"TC-11 DECTAPE Systems Manual," copyright 1971, 1972, 1973.

"PDP-11 Unibus Interface Manual," copyright 1971.

*Primary Examiner*—Debra A. Chun

[57] ABSTRACT

A digital system including a plurality of metal-oxide-semiconductor (MOS) chip random access memories (RAM), read only memories (ROM) and peripheral interface adaptors coupled to a common bidirectional data bus which is coupled to and controlled by a microprocessor unit (MPU). Each peripheral interface adaptor includes a control register loadable under program control. The contents of the control register control selection of several registers within the interface adaptor. The control register also controls other functions of the peripheral interface adaptor, including determining direction of data movement at the peripheral buffers of the interface adaptor. The contents of the control register of each interface adaptor are monitorable by the microprocessor unit.

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–6 is confirmed.

New claims 7 and 8 are added and determined to be patentable.

*7. An integrated circuit digital data processing system comprising:*
*processor means for executing a plurality of instructions, said processor means generating control information in response to execution of a first one of said instructions, generating a write signal in response to execution of a second one of said instructions, and generating a read signal in response to execution of a third one of said instructions;*
*a bidirectional data bus coupled to said processor means;*
*memory means coupled to said processor means via said bidirectional data bus for storing said instructions and for storing data;*
*a peripheral data bus for coupling a peripheral device controlled by said digital data processing system to said digital data processing system; and*
*adaptor means coupled between said peripheral data bus and said bidirectional data bus for effecting transmittal of information between said digital data processing system and said peripheral device, said peripheral device being selected from a variety of different peripheral devices each peripheral device having a different interface requirement, said adaptor means comprising:*
*(1) control register means for storing said control information in response to said write signal and for sending a representation of said stored control information to said processor means in response to said read signal; and*
*(2) interface means coupled to said peripheral data bus for sending data to and receiving data from said peripheral device, said interface means being responsive to said control information stored in said control register means for configuring said adaptor means to operate in conformity with the interface requirements of a particular type of peripheral device.*

*8. The digital data processing system as recited in claim 7 wherein said adaptor means further includes:*
*a plurality of control inputs coupled to said processor means;*
*selection means coupled to said plurality of control inputs and to said control register means, said selection means being responsive to information received from said control inputs and from said control register means for producing a plurality of selection signals in said adaptor means, each selection signal corresponding to a unique configuration of said control inputs and information stored in said control register means; and*
*second means coupled to said selection means for coupling said interface means to said bidirectional bus responsive to said selection signals.*

* * * * *